United States Patent
Khoshnevisan et al.

(10) Patent No.: US 12,143,997 B2
(45) Date of Patent: *Nov. 12, 2024

(54) TIME DOMAIN RESOURCE ALLOCATION FOR DOWNLINK DATA REPETITIONS

(71) Applicant: QUALCOMM Incorporated, San Diego, CA (US)

(72) Inventors: Mostafa Khoshnevisan, San Diego, CA (US); Wei Yang, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,013

(22) Filed: Oct. 11, 2023

(65) Prior Publication Data

US 2024/0040574 A1    Feb. 1, 2024

Related U.S. Application Data

(63) Continuation of application No. 16/993,082, filed on Aug. 13, 2020.

(Continued)

(51) Int. Cl.
*H04W 72/21*    (2023.01)
*H04B 7/0417*   (2017.01)
(Continued)

(52) U.S. Cl.
CPC .......... *H04W 72/21* (2023.01); *H04B 7/0417* (2013.01); *H04L 5/0055* (2013.01); *H04W 72/044* (2013.01)

(58) Field of Classification Search
CPC .. H04B 7/0417; H04L 5/0055; H04W 72/044; H04W 72/21
See application file for complete search history.

(56) References Cited

U.S. PATENT DOCUMENTS

| 2019/0149275 A1 | 5/2019 | He et al. |
| 2019/0268803 A1 | 8/2019 | He et al. |
| 2021/0051652 A1 | 2/2021 | Khoshnevisan et al. |

FOREIGN PATENT DOCUMENTS

| CN | 107852289 A | 3/2018 |
| WO | 2018031953 A1 | 2/2018 |

OTHER PUBLICATIONS

CATT: "Remaining Issues on HARQ-ACK Codebook", 3GPP Draft, 3GPP TSG RAN WG1 Meeting #93, R1-1806301, 3rd Generation Partnership Project (3GPP), Mobile Competence Centre, 650, Route Des Lucioles, F-06921 Sophia-Antipolis Cedex, France, May 25, 2018 (May 25, 2018), pp. 1-7, XP051462467, 7 pages Retrieved from the Internet: URL: http://www.3gpp.org/ftp/tsg%5Fran/WG1%5FRL1/TSGR1%5F93/Docs" title="Link: http://www.3gpp.org/ftp/tsg%5Fran/WG1%5FRL1/TSGR1%5F93/Docs">http://www.3gpp.org/ftp/tsg%5Fran/WG1%5FRL1/TSGR1%5F93/Docs. p. 1-p. 3.

(Continued)

*Primary Examiner* — Brian P Cox
(74) *Attorney, Agent, or Firm* — Holland & Hart LLP

(57) ABSTRACT

Methods, systems, and devices for wireless communications are described. In some systems, a base station may use a downlink control information (DCI) message to indicate timing resources to a user equipment (UE) for multiple downlink data repetitions in a slot. In a first implementation, the base station may indicate an explicit time domain resource allocation (TDRA) for one repetition in the TDRA field of the DCI, and the UE may determine implicit TDRAs for the other repetitions based on the explicit TDRA. In a second implementation, the base station may indicate a total TDRA for the full set of repetitions in the TDRA field, and the UE may divide the total TDRA into individual TDRAs for the repetitions. The UE may receive the downlink data repetitions based on determining the TDRAs and may trans- (Continued)

mit a feedback message in response based on a hybrid automatic repeat request acknowledgment (HARQ-ACK) codebook.

36 Claims, 21 Drawing Sheets

Related U.S. Application Data

(60) Provisional application No. 62/888,317, filed on Aug. 16, 2019.

(51) Int. Cl.
*H04L 5/00* (2006.01)
*H04W 72/044* (2023.01)

(56) References Cited

OTHER PUBLICATIONS

China Unicom: "PUSCH Enhancements for URLLC", 3GPP Draft, 3GPP TSG RAN WG 1 #98, R1-1908333, PUSCH Enhancements for URLLC (07.21), 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 13, 2019 (Aug. 13, 2019), XP051764943, 7 pages, p. 2 p. 4.
Ericsson: "Summary of 7.3.3.1 (Resource Allocation)", 3GPP Draft, TSG-RAN WG1 #91, R1-1721354, Summary of 7.3.3.1 (Resource Allocation), 3rd Generation Partnership Project (3GPP), Mobile Competence Centre, 650, Route Des Lucioles, F-06921 Sophia-Antipolis Cedex, France, vol. RAN WG1, No. Reno, NV, US, Nov. 27, 2017-Dec. 1, 2017, Nov. 28, 2017 (Nov. 28, 2017), XP051363846, 20 pages p. 9-p. 10 Proposal 3.1; p. 12.
International Search Report and Written Opinion—PCT/US2020/046471—ISA/EPO—Dec. 8, 2020.
Nokia., et al., "On Scheduled PUSCH (& POSCH) Repetition Enhancements for NR URLLC", 3GPP Draft, 3GPP TSG RAN WG1 Meeting #94, R1-1808576, NR URLLC PUSCH Repetiton ENH Final, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 10, 2018 (Aug. 10, 2018), XP051515953, 4 pages, p. 1-p. 2.
NTT DOCOMO, Inc: "Enhancements on Multi-TRP/Panel Transmission", 3GPP Draft, 3GPP TSG RAN WG1 #96, R1-1902812, Enhancements on Multi-TRP_Panel Transmission, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, XP051600507, 25 Pages.
Taiwan Search Report—TW109127737—TIPO—Jan. 4, 2024 (194627TW).

TIME DOMAIN RESOURCE ALLOCATION FOR DOWNLINK DATA REPETITIONS

CROSS REFERENCE

The present application for patent is a Continuation of U.S. patent application Ser. No. 16/993,082 by KHOSHNEVISAN et al., entitled "TIME DOMAIN RESOURCE ALLOCATION FOR DOWNLINK DATA REPETITIONS" filed Aug. 13, 2020, which claims the benefit of U.S. Provisional Patent Application No. 62/888,317 by KHOSHNEVISAN et al., entitled "TIME DOMAIN RESOURCE ALLOCATION FOR DOWNLINK DATA REPETITIONS," filed Aug. 16, 2019, assigned to the assignee hereof, and each of which are expressly incorporated by reference herein.

FIELD OF TECHNOLOGY

The following relates generally to wireless communications and more specifically to time domain resource allocation (TDRA) for downlink data repetitions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may schedule multiple downlink data repetitions to a UE in a single slot. However, indicating each data repetition in a separate downlink control information (DCI) message may significantly increase the signaling overhead on the downlink control channel. Furthermore, indicating resources for each data repetition in a single DCI message may significantly increase the DCI payload. Additionally or alternatively, the UE may provide feedback to the base station based on whether the UE successfully receives the downlink data repetitions. However, providing feedback for each downlink data repetition may lead to additional complexities at the UE and the base station.

SUMMARY

The described techniques relate to improved methods, systems, devices, and apparatuses that support time domain resource allocation (TDRA) for downlink data repetitions. Generally, the described techniques provide for scheduling multiple downlink data repetitions in a slot using a single downlink control information (DCI) message. For example, a base station may schedule a set of downlink data repetitions and may transmit a DCI message including a TDRA field to indicate the TDRAs for the downlink data repetitions to a user equipment (UE). In a first implementation, the base station may indicate an explicit TDRA for one repetition of the set of downlink data repetitions in the TDRA field of the DCI, and the UE may determine implicit TDRAs for the other repetitions based on the explicit TDRA. In a second implementation, the base station may indicate a total TDRA for the full set of repetitions in the TDRA field of the DCI, and the UE may divide the total TDRA into respective TDRAs for each repetition of the set of repetitions. The base station may transmit the downlink data repetitions according to the scheduling, and the UE may receive the repetitions based on determining the TDRAs from the single DCI message. Based on whether the UE successfully receives the data, the UE may transmit a feedback message using a hybrid automatic repeat request acknowledgment (HARQ-ACK) codebook. In the first implementation, the UE may transmit a positive acknowledgment or negative acknowledgment (ACK/NACK) for the downlink data occasion corresponding to the explicit TDRA, while in the second implementation the UE may transmit an ACK/NACK for the downlink data occasion corresponding to the total TDRA. In some cases, the UE may use dummy negative acknowledgments (NACKs) for other downlink data occasions not corresponding to TDRAs indicated by the DCI message.

A method for wireless communications at a UE is described. The method may include receiving, from a base station, a DCI message indicating an explicit TDRA for a first repetition of a downlink data transmission, determining one or more implicit TDRAs for one or more additional repetitions of the downlink data transmission based on the explicit TDRA, receiving, from the base station, the first repetition of the downlink data transmission and the one or more additional repetitions of the downlink data transmission according to the explicit TDRA and the one or more implicit TDRAs, and transmitting, to the base station, a feedback message based on the receiving and a HARQ-ACK codebook.

An apparatus for wireless communications at a UE is described. The apparatus may include a processor, memory coupled with the processor, and instructions stored in the memory. The instructions may be executable by the processor to cause the apparatus to receive, from a base station, a DCI message indicating an explicit TDRA for a first repetition of a downlink data transmission, determine one or more implicit TDRAs for one or more additional repetitions of the downlink data transmission based on the explicit TDRA, receive, from the base station, the first repetition of the downlink data transmission and the one or more additional repetitions of the downlink data transmission according to the explicit TDRA and the one or more implicit TDRAs, and transmit, to the base station, a feedback message based on the receiving and a HARQ-ACK codebook.

Another apparatus for wireless communications at a UE is described. The apparatus may include means for receiving, from a base station, a DCI message indicating an explicit TDRA for a first repetition of a downlink data transmission, determining one or more implicit TDRAs for one or more additional repetitions of the downlink data transmission based on the explicit TDRA, receiving, from the base station, the first repetition of the downlink data transmission and the one or more additional repetitions of the downlink data transmission according to the explicit TDRA and the one or more implicit TDRAs, and transmitting, to the base station, a feedback message based on the receiving and a HARQ-ACK codebook.

A non-transitory computer-readable medium storing code for wireless communications at a UE is described. The code may include instructions executable by a processor to receive, from a base station, a DCI message indicating an explicit TDRA for a first repetition of a downlink data transmission, determine one or more implicit TDRAs for one or more additional repetitions of the downlink data transmission based on the explicit TDRA, receive, from the base station, the first repetition of the downlink data transmission and the one or more additional repetitions of the downlink data transmission according to the explicit TDRA and the one or more implicit TDRAs, and transmit, to the base station, a feedback message based on the receiving and a HARQ-ACK codebook.

Some examples of the method, apparatuses, and non-transitory computer-readable medium described herein may further include operations, features, means, or instructions for generating the HARQ-ACK codebook based on the explicit TDRA and the receiving.

In some examples of the method, apparatuses, and non-transitory computer-readable medium described herein, generating the HARQ-ACK codebook may include operations, features, means, or instructions for inserting, for a first downlink data occasion of the HARQ-ACK codebook, an ACK/NACK indication for the downlink data transmission based on the explicit TDRA and the receiving.

In some examples of the method, apparatuses, and non-transitory computer-readable medium described herein, generating the HARQ-ACK codebook further may include operations, features, means, or instructions for inserting, for one or more additional downlink data occasions of the HARQ-ACK codebook, one or more dummy NACK indications for the downlink data transmission based on no explicit TDRA corresponding to the one or more additional downlink data occasions.

In some examples of the method, apparatuses, and non-transitory computer-readable medium described herein, the feedback message may be transmitted in a first slot for feedback and generating the HARQ-ACK codebook further may include operations, features, means, or instructions for inserting, for one or more additional downlink data occasions of the HARQ-ACK codebook, one or more dummy NACK indications for the downlink data transmission based on an additional explicit TDRA corresponding to at least one of the one or more additional downlink data occasions indicating a second slot for feedback that is different from the first slot for feedback.

In some examples of the method, apparatuses, and non-transitory computer-readable medium described herein, a size of the HARQ-ACK codebook may be based on a set of TDRA candidates, where the explicit TDRA corresponds to a candidate of the set of TDRA candidates and downlink data occasions of the HARQ-ACK codebook may be based on the set of TDRA candidates.

Some examples of the method, apparatuses, and non-transitory computer-readable medium described herein may further include operations, features, means, or instructions for refraining from including a TDRA candidate in the set of TDRA candidates if a symbol of the TDRA candidate is configured for uplink, all symbols of the TDRA candidate are configured for uplink, at most one consecutive symbol of the TDRA candidate is configured for downlink, or a combination thereof.

In some examples of the method, apparatuses, and non-transitory computer-readable medium described herein, a number of repetitions for the downlink data transmissions may be semi-statically configured and some examples of the method, apparatuses, and non-transitory computer-readable medium described herein may further include operations, features, means, or instructions for determining the set of TDRA candidates to cover both explicit TDRA candidates and corresponding implicit TDRA candidates based on the number of repetitions.

In some examples of the method, apparatuses, and non-transitory computer-readable medium described herein, the HARQ-ACK codebook includes a semi-static codebook, a type-1 codebook, or a combination thereof.

Some examples of the method, apparatuses, and non-transitory computer-readable medium described herein may further include operations, features, means, or instructions for identifying a number of repetitions for the downlink data transmission, where determining the one or more implicit TDRAs may be based on the number of repetitions. In some examples of the method, apparatuses, and non-transitory computer-readable medium described herein, the number of repetitions may be identified based on the DCI message, a radio resource control (RRC) configuration, or a combination thereof.

In some examples of the method, apparatuses, and non-transitory computer-readable medium described herein, the number of repetitions may include a nominal number of repetitions and some examples of the method, apparatuses, and non-transitory computer-readable medium described herein may further include operations, features, means, or instructions for determining an actual number of repetitions based on the nominal number of repetitions and a slot boundary, an uplink/downlink switching point, or a combination thereof, where determining the one or more implicit TDRAs may be based on the actual number of repetitions.

In some examples of the method, apparatuses, and non-transitory computer-readable medium described herein, no symbol of the explicit TDRA may be configured for uplink. In some examples of the method, apparatuses, and non-transitory computer-readable medium described herein, the explicit TDRA and the one or more implicit TDRAs may be within a single slot. In some other examples of the method, apparatuses, and non-transitory computer-readable medium described herein, the explicit TDRA and the one or more implicit TDRAs may span a set of slots and a feedback timing indicator corresponds to a last slot in time of the set of slots, where the feedback message may be transmitted based on the feedback timing indicator.

In some examples of the method, apparatuses, and non-transitory computer-readable medium described herein, the explicit TDRA may span the set of slots and the first repetition of the downlink data transmission may include a first nominal repetition. Some examples of the method, apparatuses, and non-transitory computer-readable medium described herein may further include operations, features, means, or instructions for determining a first actual repetition of the downlink data transmission in a first slot of the set of slots and a second actual repetition of the downlink data transmission in a second slot of the set of slots subsequent to the first slot based on the first nominal repetition, where the second slot includes the last slot of the set of slots.

Some examples of the method, apparatuses, and non-transitory computer-readable medium described herein may further include operations, features, means, or instructions for modifying a set of TDRA candidates based on TDRA candidates that span across a slot boundary, where the HARQ-ACK codebook may be based on the modified set of TDRA candidates.

In some examples of the method, apparatuses, and non-transitory computer-readable medium described herein, the first repetition of the downlink data transmission and each of the one or more additional repetitions of the downlink data transmission may have a same length. In some examples of the method, apparatuses, and non-transitory computer-readable medium described herein, the explicit TDRA precedes the one or more implicit TDRAs in time. In some other examples of the method, apparatuses, and non-transitory computer-readable medium described herein, the explicit TDRA is subsequent to the one or more implicit TDRAs in time. In some examples of the method, apparatuses, and non-transitory computer-readable medium described herein, the explicit TDRA and the one or more implicit TDRAs may be contiguous in time.

In some examples of the method, apparatuses, and non-transitory computer-readable medium described herein, the DCI message may indicate the explicit TDRA according to a start symbol, an allocation length, a start and length indicator, a mapping type, a slot offset, or a combination thereof.

A method for wireless communications at a UE is described. The method may include receiving, from a base station, a DCI message indicating a total TDRA for a set of repetitions of a downlink data transmission, determining a set of TDRAs for the set of repetitions of the downlink data transmission based on the total TDRA and a number of repetitions for the downlink data transmission, receiving, from the base station, the set of repetitions of the downlink data transmission according to the set of TDRAs, and transmitting, to the base station, a feedback message based on the receiving and a HARQ-ACK codebook.

An apparatus for wireless communications at a UE is described. The apparatus may include a processor, memory coupled with the processor, and instructions stored in the memory. The instructions may be executable by the processor to cause the apparatus to receive, from a base station, a DCI message indicating a total TDRA for a set of repetitions of a downlink data transmission, determine a set of TDRAs for the set of repetitions of the downlink data transmission based on the total TDRA and a number of repetitions for the downlink data transmission, receive, from the base station, the set of repetitions of the downlink data transmission according to the set of TDRAs, and transmit, to the base station, a feedback message based on the receiving and a HARQ-ACK codebook.

Another apparatus for wireless communications at a UE is described. The apparatus may include means for receiving, from a base station, a DCI message indicating a total TDRA for a set of repetitions of a downlink data transmission, determining a set of TDRAs for the set of repetitions of the downlink data transmission based on the total TDRA and a number of repetitions for the downlink data transmission, receiving, from the base station, the set of repetitions of the downlink data transmission according to the set of TDRAs, and transmitting, to the base station, a feedback message based on the receiving and a HARQ-ACK codebook.

A non-transitory computer-readable medium storing code for wireless communications at a UE is described. The code may include instructions executable by a processor to receive, from a base station, a DCI message indicating a total TDRA for a set of repetitions of a downlink data transmission, determine a set of TDRAs for the set of repetitions of the downlink data transmission based on the total TDRA and a number of repetitions for the downlink data transmission, receive, from the base station, the set of repetitions of the downlink data transmission according to the set of TDRAs, and transmit, to the base station, a feedback message based on the receiving and a HARQ-ACK codebook.

In some examples of the method, apparatuses, and non-transitory computer-readable medium described herein, the set of TDRAs may be determined further based on a set of possible sizes for each TDRA of the set of TDRAs, an equal distribution of the set of TDRAs in the total TDRA, or a combination thereof.

Some examples of the method, apparatuses, and non-transitory computer-readable medium described herein may further include operations, features, means, or instructions for identifying the number of repetitions for the downlink data transmission based on the DCI message, an RRC configuration, a fixed repetition value, or a combination thereof.

Some examples of the method, apparatuses, and non-transitory computer-readable medium described herein may further include operations, features, means, or instructions for determining a set of TDRA candidates based on an uplink symbol, where the HARQ-ACK codebook may be based on the determined set of TDRA candidates. In some examples of the method, apparatuses, and non-transitory computer-readable medium described herein, determining the set of TDRA candidates may include operations, features, means, or instructions for refraining from including a TDRA candidate in the set of TDRA candidates if a symbol of the TDRA candidate is configured for uplink, all symbols of the TDRA candidate are configured for uplink, at most one consecutive symbol of the TDRA candidate is configured for downlink, or a combination thereof.

In some examples of the method, apparatuses, and non-transitory computer-readable medium described herein, no symbol of the total TDRA may be configured for uplink. In some examples of the method, apparatuses, and non-transitory computer-readable medium described herein, the total TDRA may be within a single slot. In some other examples of the method, apparatuses, and non-transitory computer-readable medium described herein, the total TDRA may span a set of slots and a feedback timing indicator corresponds to a last slot in time of the set of slots, where the feedback message may be transmitted based on the feedback timing indicator. In some examples of the method, apparatuses, and non-transitory computer-readable medium described herein, the set of TDRAs may be determined further based on a slot boundary of the set of slots.

In some examples of the method, apparatuses, and non-transitory computer-readable medium described herein, a first symbol in time of each TDRA of the set of TDRAs corresponds to a demodulation reference signal (DMRS) symbol. In some examples of the method, apparatuses, and non-transitory computer-readable medium described herein, the DCI message indicates the total TDRA according to a start symbol, an allocation length, a start and length indicator, a mapping type, a slot offset, or a combination thereof.

A method for wireless communications at a base station is described. The method may include transmitting, to a UE, a DCI message indicating an explicit TDRA for a first repetition of a downlink data transmission, transmitting, to the UE, the first repetition of the downlink data transmission according to the explicit TDRA and one or more additional repetitions of the downlink data transmission according to one or more implicit TDRAs, where the one or more implicit TDRAs are based on the explicit TDRA, and receiving, from the UE, a feedback message based on the explicit TDRA and a HARQ-ACK codebook.

An apparatus for wireless communications at a base station is described. The apparatus may include a processor, memory coupled with the processor, and instructions stored in the memory. The instructions may be executable by the processor to cause the apparatus to transmit, to a UE, a DCI message indicating an explicit TDRA for a first repetition of a downlink data transmission, transmit, to the UE, the first repetition of the downlink data transmission according to the explicit TDRA and one or more additional repetitions of the downlink data transmission according to one or more implicit TDRAs, where the one or more implicit TDRAs are based on the explicit TDRA, and receive, from the UE, a feedback message based on the explicit TDRA and a HARQ-ACK codebook.

Another apparatus for wireless communications at a base station is described. The apparatus may include means for transmitting, to a UE, a DCI message indicating an explicit TDRA for a first repetition of a downlink data transmission, transmitting, to the UE, the first repetition of the downlink data transmission according to the explicit TDRA and one or more additional repetitions of the downlink data transmission according to one or more implicit TDRAs, where the one or more implicit TDRAs are based on the explicit TDRA, and receiving, from the UE, a feedback message based on the explicit TDRA and a HARQ-ACK codebook.

A non-transitory computer-readable medium storing code for wireless communications at a base station is described. The code may include instructions executable by a processor to transmit, to a UE, a DCI message indicating an explicit TDRA for a first repetition of a downlink data transmission, transmit, to the UE, the first repetition of the downlink data transmission according to the explicit TDRA and one or more additional repetitions of the downlink data transmission according to one or more implicit TDRAs, where the one or more implicit TDRAs are based on the explicit TDRA, and receive, from the UE, a feedback message based on the explicit TDRA and a HARQ-ACK codebook.

In some examples of the method, apparatuses, and non-transitory computer-readable medium described herein, the HARQ-ACK codebook includes an ACK/NACK indication for the downlink data transmission based on the explicit TDRA and whether the UE successfully receives the first repetition of the downlink data transmission.

Some examples of the method, apparatuses, and non-transitory computer-readable medium described herein may further include operations, features, means, or instructions for transmitting, to the UE, an indication of a number of repetitions for the downlink data transmission in the DCI message, an RRC configuration, or a combination thereof, where the one or more implicit TDRAs may be further based on the number of repetitions. In some examples of the method, apparatuses, and non-transitory computer-readable medium described herein, the indication of the number of repetitions may indicate a nominal number of repetitions and some examples of the method, apparatuses, and non-transitory computer-readable medium described herein may further include operations, features, means, or instructions for determining an actual number of repetitions based on the nominal number of repetitions and a slot boundary, an uplink/downlink switching point, or a combination thereof, where the one or more implicit TDRAs may be further based on the actual number of repetitions.

Some examples of the method, apparatuses, and non-transitory computer-readable medium described herein may further include operations, features, means, or instructions for scheduling the explicit TDRA such that no symbol of the explicit TDRA is configured for uplink.

Some examples of the method, apparatuses, and non-transitory computer-readable medium described herein may further include operations, features, means, or instructions for scheduling the explicit TDRA and the one or more implicit TDRAs such that the explicit TDRA and the one or more implicit TDRAs are within a single slot. Some other examples of the method, apparatuses, and non-transitory computer-readable medium described herein may further include operations, features, means, or instructions for scheduling the explicit TDRA and the one or more implicit TDRAs such that the explicit TDRA and the one or more implicit TDRAs span a set of slots and transmitting, in the DCI message, a feedback timing indicator corresponding to a last slot in time of the set of slots, where the feedback message may be received based on the feedback timing indicator.

A method for wireless communications at a base station is described. The method may include transmitting, to a UE, a DCI message indicating a total TDRA for a set of repetitions of a downlink data transmission, transmitting, to the UE, the set of repetitions of the downlink data transmission according to a set of TDRAs, where the total TDRA includes the set of TDRAs based on a number of repetitions for the downlink data transmission, and receiving, from the UE, a feedback message based on the total TDRA and a HARQ-ACK codebook.

An apparatus for wireless communications at a base station is described. The apparatus may include a processor, memory coupled with the processor, and instructions stored in the memory. The instructions may be executable by the processor to cause the apparatus to transmit, to a UE, a DCI message indicating a total TDRA for a set of repetitions of a downlink data transmission, transmit, to the UE, the set of repetitions of the downlink data transmission according to a set of TDRAs, where the total TDRA includes the set of TDRAs based on a number of repetitions for the downlink data transmission, and receive, from the UE, a feedback message based on the total TDRA and a HARQ-ACK codebook.

Another apparatus for wireless communications at a base station is described. The apparatus may include means for transmitting, to a UE, a DCI message indicating a total TDRA for a set of repetitions of a downlink data transmission, transmitting, to the UE, the set of repetitions of the downlink data transmission according to a set of TDRAs, where the total TDRA includes the set of TDRAs based on a number of repetitions for the downlink data transmission, and receiving, from the UE, a feedback message based on the total TDRA and a HARQ-ACK codebook.

A non-transitory computer-readable medium storing code for wireless communications at a base station is described. The code may include instructions executable by a processor to transmit, to a UE, a DCI message indicating a total TDRA for a set of repetitions of a downlink data transmission, transmit, to the UE, the set of repetitions of the downlink data transmission according to a set of TDRAs, where the total TDRA includes the set of TDRAs based on a number of repetitions for the downlink data transmission, and receive, from the UE, a feedback message based on the total TDRA and a HARQ-ACK codebook.

In some examples of the method, apparatuses, and non-transitory computer-readable medium described herein, the HARQ-ACK codebook includes an ACK/NACK indication for the downlink data transmission based on the total TDRA and whether the UE successfully receives the set of repetitions of the downlink data transmission.

Some examples of the method, apparatuses, and non-transitory computer-readable medium described herein may further include operations, features, means, or instructions for transmitting, to the UE, an indication of the number of repetitions for the downlink data transmission in the DCI message, an RRC configuration, or a combination thereof.

Some examples of the method, apparatuses, and non-transitory computer-readable medium described herein may further include operations, features, means, or instructions for scheduling the total TDRA such that no symbol of the total TDRA is configured for uplink.

Some examples of the method, apparatuses, and non-transitory computer-readable medium described herein may further include operations, features, means, or instructions for scheduling the total TDRA such that the total TDRA may be within a single slot. Some other examples of the method, apparatuses, and non-transitory computer-readable medium described herein may further include operations, features, means, or instructions for scheduling the total TDRA such that the total TDRA spans a set of slots and transmitting, in the DCI message, a feedback timing indicator corresponding to a last slot in time of the set of slots, where the feedback message may be received based on the feedback timing indicator.

DETAILED DESCRIPTION

Figure 1:
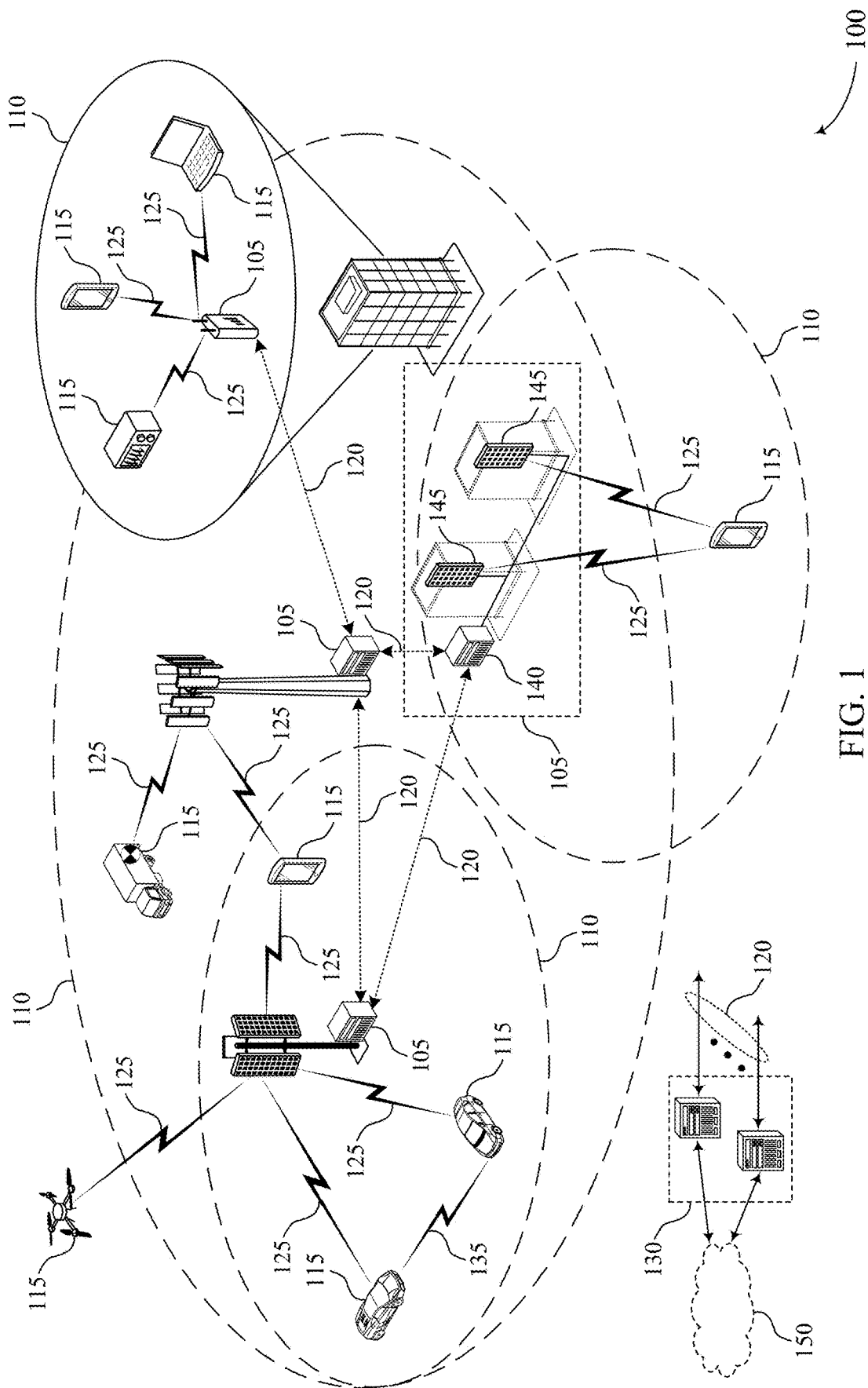
FIGS. 1 and 2 illustrate examples of wireless communications systems that support time domain resource allocation (TDRA) for downlink data repetitions in accordance with aspects of the present disclosure.

In some wireless communications systems, a base station may schedule multiple repetitions of downlink data transmissions to a user equipment (UE) in a same transmission time interval (TTI) (e.g., a single slot). Each repetition of the downlink data transmission within the slot may use a common modulation and coding scheme (MCS), while using a same or different redundancy version (RV) and transmission configuration indicator (TCI) state. The base station may use a single downlink control information (DCI) message and a single time domain resource allocation (TDRA) field in the DCI message to indicate the timing resources for the downlink data repetitions. In some cases, the downlink data repetitions may be confined to a single slot. In other cases, the downlink data repetitions may span multiple slots.

In a first implementation, the base station may set the value of the TDRA field in the DCI message to indicate timing information for a single data repetition of the downlink data repetitions (e.g., the first repetition, the last repetition, etc.). The base station may use the TDRA field to indicate an "explicit" TDRA for the single repetition, and the TDRAs for the other repetitions of the downlink data repetitions may be implicitly indicated by this explicit TDRA. For example, a UE receiving the DCI message may determine the explicit TDRA from the TDRA field. Using this explicit TDRA (and a set of rules or configurations for the other repetitions), the UE may determine one or more "implicit" TDRAs for the other repetitions of the downlink data repetitions. The UE may receive the downlink data repetitions based on these determined TDRAs and may transmit a feedback message to the base station using a hybrid automatic repeat request acknowledgment (HARQ-ACK) codebook, where the UE indicates a positive acknowledgment or negative acknowledgment (ACK/NACK) for the downlink data occasion corresponding to the explicit TDRA. The UE may use dummy negative acknowledgments (NACKs) for downlink data occasions without an explicit TDRA (e.g., including downlink data occasions corresponding to the implicit TDRAs).

In a second implementation, the base station may set the value of the TDRA field in the DCI message to indicate timing information for the aggregate set of downlink data repetitions. The base station may use the TDRA field to indicate a "total" TDRA for the set of downlink data repetitions, and the individual TDRAs for each specific repetition of the downlink data repetitions may be implicitly derived from this total TDRA. For example, the UE may receive the DCI message and determine the total TDRA from the TDRA field. Using the total TDRA (and a set of rules or configurations for the individual repetitions), the UE may determine a set of TDRAs, where each TDRA corresponds to a respective repetition of the downlink data repetitions. The UE may receive the downlink data repetitions based on these determined TDRAs and may transmit a feedback message to the base station using a HARQ-ACK codebook, where the UE indicates an ACK/NACK for the downlink data occasion corresponding to the total TDRA.

Aspects of the disclosure are initially described in the context of wireless communications systems. Additional aspects of the disclosure are described with reference to TDRAs and codebook generation processes. Aspects of the disclosure are further illustrated by and described with reference to apparatus diagrams, system diagrams, and flowcharts that relate to time domain resource allocation for downlink data repetitions.

FIG. 1 illustrates an example of a wireless communications system 100 that supports time domain resource allocation for downlink data repetitions in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems 100, a base station 105 may schedule multiple downlink data repetitions for a transport block (TB) within a single slot. For example, the base station 105 may schedule time division multiplexed (TDM) repetitions with mini-slot granularities using a single DCI message. In some cases, using a single DCI to schedule multiple repetitions for a single slot (e.g., single-DCI based multi-transmission/reception point (TRP) and/or multi-TCI state scheduling) may be referred to as "scheme 3." For "scheme 3," the base station 105 may schedule the repetitions such that n TCI states are scheduled within the slot with non-overlapping TDRAs. Each transmission occasion (e.g., each repetition) of the TB may have one TCI state and one RV with a mini-slot time granularity (e.g., 2 symbols, 3 symbols, 4 symbols, 7 symbols, etc.). These TCI states and RVs may be the same or different for different transmission occasions in the set of repetitions. However, all transmission occasions for the set of repetitions within the slot may use a common MCS with the same demodulation reference signal (DMRS) port(s) (e.g., a single DMRS port or multiple DMRS ports). In some cases, the set of downlink data repetitions may support channel estimation interpolation across mini-slots with the same TCI states (i.e., the same TCI indexes).

The base station 105 may use a single TDRA indication in a single DCI message to indicate different mini-slots corresponding to different scheduled downlink data repetitions (e.g., physical downlink shared channel (PDSCH) repetitions). Additionally, the base station 105 may indicate a number of repetitions, a number of TCI states, or both for the set of downlink data repetitions. In some examples, these values may correspond to a maximum number of repetitions, a maximum number of TCI states, or both. In some cases, the base station 105 may schedule the set of downlink data repetitions such that the overall time allocation for the repetitions does not cross any slot boundaries. In some other cases, the base station 105 may schedule the set of downlink data repetition such that the overall time allocation crosses one or more slot boundaries (although individual repetitions may not cross the slot boundaries). The scheduling of the downlink data repetitions may impact how a UE 115 receiving the downlink data repetitions implements a HARQ-ACK codebook to provide feedback for the data. In some cases, the codebook may be an example of a semi-static (type-1) HARQ-ACK codebook.

In a first implementation, the base station 105 may indicate an explicit TDRA for one repetition of the set of downlink data repetitions in the TDRA field of a DCI message. A UE 115 receiving the DCI message may identify the explicit TDRA from the TDRA field and may determine implicit TDRAs for the other repetitions based on the explicit TDRA. The UE 115 may provide feedback to the base station 105 by inserting an ACK/NACK indication for the explicit TDRA into a HARQ-ACK codebook. In a second implementation, the base station 105 may indicate a total TDRA for the full set of downlink data repetitions in the TDRA field of the DCI message. The UE 115 receiving the DCI message may identify the total TDRA from the TDRA field and may derive individual TDRAs corresponding to each of the downlink data repetitions based on the total TDRA. The UE 115 may provide feedback to the base station 105 by inserting an ACK/NACK indication for the total TDRA into a HARQ-ACK codebook.

Figure 2:
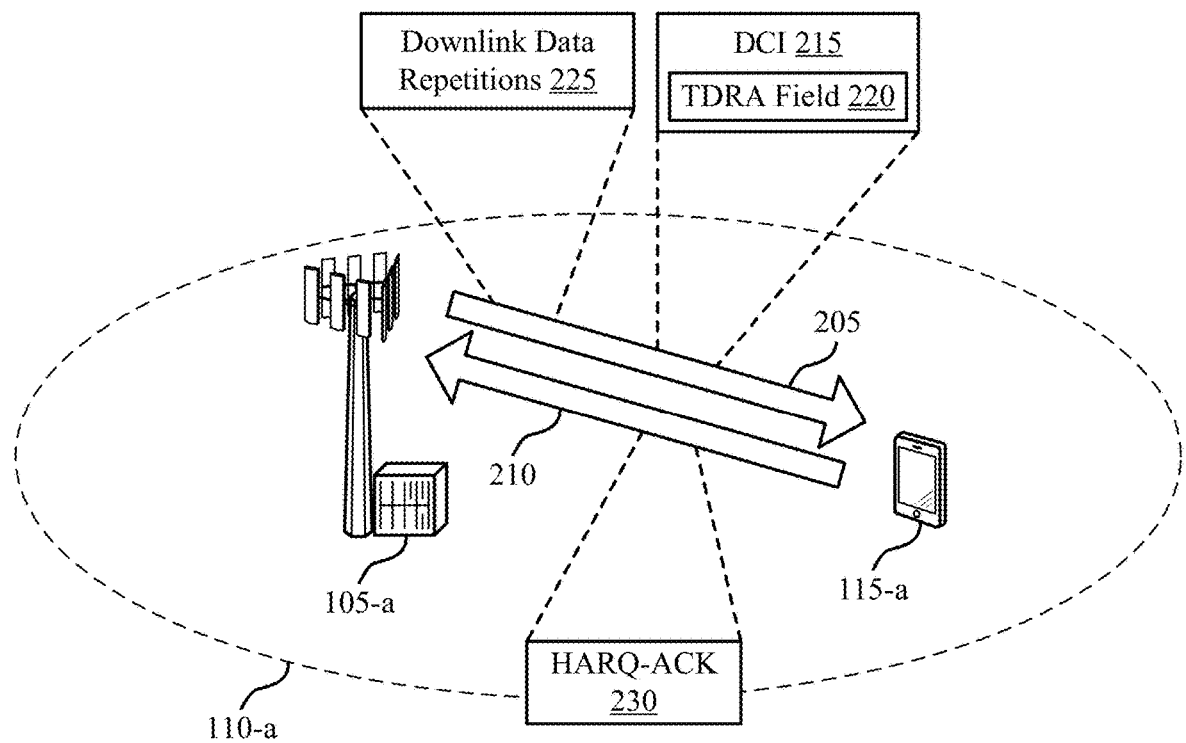

FIG. 2 illustrates an example of a wireless communications system 200 that supports TDRA for downlink data repetitions in accordance with aspects of the present disclosure. The wireless communications system 200 may include UE 115-a and base station 105-a, which may be examples of the wireless devices described with reference to FIG. 1. Base station 105-a may serve a geographic coverage area 110-a, which may be an example of a geographic coverage area 110 as described with reference to FIG. 1. Base station 105-a may schedule downlink transmissions to UE 115-a on downlink channel 205, and UE 115-a may transmit messages to base station 105-a on uplink channel 210. The downlink channel 205 may be a downlink control channel, a downlink data channel, or a representation of both a downlink control channel and a downlink data channel. Similarly, the uplink channel 210 may correspond to an uplink control channel, an uplink data channel, or both. In some cases, base station 105-a may schedule multiple downlink data repetitions 225 to UE 115-a in a single TTI (e.g., a single slot). Base station 105-a may indicate TDRA for the downlink data repetitions 225 in a single DCI message 215, reducing overhead on the downlink control channel (e.g., the physical downlink control channel (PDCCH)) as compared to transmitting multiple DCI messages to schedule the multiple repetitions. Additionally, base station 105-a may use a single TDRA field 220 in the DCI message 215 to indicate the TDRA for the downlink data repetitions 225, efficiently utilizing the payload of the DCI message 215.

For a downlink grant (e.g., base station 105-a granting resources for the multiple downlink data repetitions 225), base station 105-a may include a TDRA field 220 in a DCI message 215. In some examples, this DCI message 215 may utilize DCI format 1_0, DCI format 1_1, or some other DCI format. The TDRA field 220 may indicate a mapping type, a slot offset (K0), a start symbol (S), an allocation length (L), a start and length indicator (SLIV), or some combination of these parameters. For example, the mapping type may indicate either PDSCH mapping type A or PDSCH mapping type B for the downlink data repetitions. The different mapping types may correspond to different UE capabilities and may support different values of S, L, and/or SLIV. In some cases, mapping type A may correspond to repetitions with DMRS in a fixed symbol, while mapping type B may correspond to repetitions in which the DMRS can be in any symbol of the slot for each repetition. Furthermore, different repetitions can have different mapping types based on an explicit indication in the DCI or a fixed rule. For example, the first repetition in the beginning of a slot can have mapping type A, while other repetitions later in the slot can have mapping type B. In this example, either multiple mapping types are indicated in the DCI or one mapping type is indicated in the DCI and may apply to a subset of the repetitions. The slot offset, K0, may indicate timing for the downlink data repetitions 225 (e.g., relative to the DCI 215). For example, the downlink data repetitions 225 (e.g., the PDSCH transmissions) may be transmitted in slot n+K0, where n is the slot with the scheduling DCI 215. If the downlink data repetitions 225 span multiple slots, the slot offset may indicate the first or the last slot in the time domain containing the downlink data repetitions 225. The start symbol, S, may indicate the start symbol for a TDRA and the allocation length, L, may indicate the duration of the TDRA. Alternatively, the SLIV can indicate S and L jointly (e.g., according to Equation 1 below).

if $(L-1) \leq 7$ then SLIV=14·$(L-1)$+$S$ else SLIV=14·$(14-L+1)$+$(14-1-S)$ (1)

where $0 < L \leq 14 - S$. In a specific example, the TDRA field 220 may indicate either typeA or typeB for the mapping type, a value between 0 and 32 for K0, and a value between 0 and 127 for the SLIV.

Additionally or alternatively, the TDRA field 220 may indicate an entity of the higher layer parameter PDSCH-TimeDomainAllocationList if this higher layer parameter is configured. In such cases, the TDRA field 220 may include a number of bits depending on the number of entries in the configurable table for the time domain allocation list (e.g., 0-4 bits). Otherwise, the TDRA field 220 may indicate an entry in a default table (e.g., using a set number of bits, such as 4 bits).

Base station 105-a may schedule downlink data repetitions 225 and may determine the TDRA field 220 based on the scheduled downlink data repetitions 225. In a first example, base station 105-a may set the value of the TDRA field 220 to indicate timing information for a single data repetition of the downlink data repetitions 225 (e.g., the first repetition in the time domain, the last repetition in the time domain, etc.). In some cases, this single data repetition indicated by the TDRA field 220 may be referred to as a "first repetition," where "first" does not have any temporal connotation (e.g., as the "first" repetition may precede the other repetitions or be subsequent to the other repetitions in the time domain). In such an example, base station 105-a may use the TDRA field 220 to indicate an "explicit" TDRA for the single repetition, and the TDRAs for the other repetitions of the downlink data repetitions 225 may be implicitly indicated by this explicit TDRA. For example, an "explicit" TDRA may be indicated using bits (e.g., the TDRA field 220) in a message. In some examples, the bits may indicate a mapping type, a K0 value, an S value, an L value, an SLIV value, or some combination of these parameters to explicitly define the parameters for a TDRA. An "implicit" TDRA may not be indicated using bits in a message but may instead be determined in relation to an explicit TDRA. For example, the bits in the TDRA field 220 may not indicate one or more values for an implicit TDRA, but UE 115-a may determine parameters for the implicit TDRA based on a relationship between the implicit TDRA and an explicit TDRA (or based on any other relationships configured at UE 115-a). UE 115-a may receive the DCI message 215 and determine the explicit TDRA from the TDRA field 220. Using the explicit TDRA (and a set of rules or configurations for the other repetitions), UE 115-a may determine one or more "implicit" TDRAs for the other repetitions of the downlink data repetitions 225.

In a second example, base station 105-a may set the value of the TDRA field 220 to indicate timing information for the aggregate set of downlink data repetitions 225. In such an example, base station 105-a may use the TDRA field 220 to indicate a "total" TDRA for the downlink data repetitions 225, and the individual TDRAs for each specific repetition of the downlink data repetitions 225 may be implicitly derived from this total TDRA. UE 115-a may receive the DCI message 215 and determine the total TDRA from the TDRA field 220. Using the total TDRA (and a set of rules or configurations for the individual repetitions), UE 115-a may determine a set of TDRAs, where each TDRA corresponds to a respective repetition of the downlink data repetitions 225.

Base station 105-a may transmit the downlink data repetitions 225 in the scheduled timing resources (e.g., granted by the DCI message 215). UE 115-a may receive the downlink data repetitions 225 in the allocated timing resources according to the determined TDRAs. Based on whether the data reception procedures are successful, UE 115-a may transmit a feedback message to base station 105-a. For example, UE 115-a may transmit HARQ-ACK information 230 in the feedback message to base station 105-a. The HARQ-ACK information 230 may indicate whether UE 115-a successfully received the downlink data repetitions 225 (or at least a subset of the downlink data repetitions 225). Based on this HARQ-ACK information 230, base station 105-a may determine whether to retransmit downlink data to UE 115-a (e.g., if UE 115-a fails to indicate that it successfully received the downlink data, if UE 115-a indicates that it failed to receive the downlink data, etc.).

The HARQ-ACK information 230 may be based on a HARQ-ACK codebook. In some examples, the codebook may be an example of a semi-static (type 1) codebook. However, in other examples, other codebook formats may be used for the HARQ-ACK information 230 for downlink data repetitions 225. The size of the HARQ-ACK codebook may be determined (e.g., by UE 115-a) via semi-static information. For example, UE 115-a may determine the size of the HARQ-ACK codebook based on possible scheduling occasions for downlink data candidates (e.g., PDSCH occasions or occasions for candidate PDSCH receptions). UE 115-a may not take any PDCCH monitoring occasions into account when determining the size of the HARQ-ACK codebook.

UE 115-a may determine a set of PDSCH occasions for each downlink serving cell serving the UE 115-a. For example, UE 115-a may determine PDSCH occasions for base station 105-a. If UE 115-a is concurrently served by another serving cell (e.g., in a carrier aggregation (CA) configuration), UE 115-a may additionally determine PDSCH occasions for an additional serving cell (not shown). UE 115-a may determine the set of PDSCH occasions for a downlink serving cell based on a set of configured PDSCH-to-HARQ-ACK delay (K1) values, a set of TDRA candidates, a time division duplexing (TDD) configuration, or a combination thereof. For example, UE 115-a may be configured with a set of potential K1 values based on the type of DCI configured for the serving cell. If DCI 1_0 (but not DCI 1_1) is configured for the serving cell, the K1 value may be from the set {1, 2, 3, 4, 5, 6, 7, 8}. If DCI 1_1 is configured for the serving cell, the K1 value may be semi-statically indicated to UE 115-a in a dl-DataToUL-ACK field in a physical uplink control channel (PUCCH)-Config. UE 115-a may additionally be configured with a set of PDSCH TDRA candidates (within a slot) denoted by a parameter, R. This configuration may be based on a configured TDRA table for UE 115-a or a default TDRA table. The TDD configuration may indicated uplink and downlink symbols within a slot for UE 115-a.

UE 115-a may arrange the HARQ-ACK codebook in a time-first (e.g., based on PDSCH occasions), cell second manner. In some case, the number of ACK/NACK indications or bits for the UE 115-a to use per PDSCH occasion per serving cell may depend on one or more configurations, such as the number of TBs per PDSCH (e.g., 1 or 2), the code block group (CBG) configurations (e.g., up to 8), or any other configurations. In the codebook, UE 115-a may insert an actual ACK/NACK indication for a PDSCH occasion if UE 115-a receives a DCI message 215 that instructs the UE 115-a to feedback ACK/NACK information for the corresponding PDSCH in a slot n (e.g., in a PUCCH message, in a physical uplink shared channel (PUSCH) message, etc.). For example, if UE 115-a successfully receives and decodes the PDSCH, UE 115-a may insert a positive acknowledgment (ACK) into the HARQ-ACK codebook. If UE 115-a does not successfully receive and/or decode the PDSCH, UE 115-a may insert a NACK into the HARQ-ACK codebook. Additionally or alternatively, UE 115-a may insert a NACK into the HARQ-ACK codebook for PDSCH occasions for which UE 115-a does not receive instructions to provide ACK/NACK feedback in the slot n. As such, the NACK may not indicate a reception or decoding failure at UE 115-a, but may simply indicate that UE 115-a did not receive data in the PDSCH occasion. This also may support robustness against missed DCI messages 215, as UE 115-a may report a NACK even if the UE 115-a misses the DCI message 215 requesting the ACK/NACK feedback.

The size of the HARQ-ACK codebook may be larger for UEs 115 supporting mini-slot configurations as compared to UEs 115 supporting one TB per slot. For example, because a mini-slot configuration can support more than one PDSCH occasion per slot, UE 115-a may feedback multiple ACK/NACK bits for the multiple PDSCH occasions. In some cases, an ACK/NACK indication may be a single bit, where one bit value for the bit (e.g., 1) indicates an ACK and the other bit value for the bit (e.g., 0) indicates a NACK. Additionally or alternatively, the size of the HARQ-ACK codebook may be based on the size of the K1 set, the number of serving cells (e.g., component carriers (CCs)), the number of CBG configurations, etc. In some cases, UE 115-a may feedback HARQ-ACK information 230 for multiple slots using a single HARQ-ACK codebook (e.g., based on the range of K1 values).

UE 115-a may determine a number of PDSCH occasions (e.g., per serving cell) for HARQ-ACK feedback based on the configured TDRA candidates for a slot. In one example, UE 115-a may initialize a set of PDSCH occasions, $M_{A,c}$, as an empty set. UE 115-a may iterate through an outer loop over the set of K1 values $K_{1,k} \in K_1$. UE 115-a may consider the set of TDRA candidates R and may remove all candidates in slot $n-K_{1,k}$ that conflict (in at least one symbol) with the corresponding TDD uplink/downlink configuration. UE 115-a may then consider all remaining TDRA candidates R. If UE 115-a indicates a UE capability to receive more than one unicast PDSCH per slot (e.g., UE 115-a supports receiving multiple mini-slot-based PDSCH transmissions per slot), UE 115-a may partition the set of TDRA candidates into subgroups of TDRA candidates. The number of subgroups may correspond to the maximum number of possible non-overlapping PDSCH receptions per slot based on the rows of R (i.e., the TDRA candidates in R). Each subgroup may represent a separate PDSCH occasion in slot $n-K_{1,k}$. In this way, a single PDSCH occasion may correspond to one or more TDRA candidates for UE 115-a.

In the first example described herein (e.g., implementing an explicit TDRA indication in the DCI message 215), UE 115-a may determine the HARQ-ACK information 230 based on the explicit TDRA. For example, UE 115-a may generate a HARQ-ACK codebook by inserting an ACK/

NACK for the PDSCH occasion corresponding to the explicit TDRA, while inserting dummy NACKs for any PDSCH occasions within the slot that do not correspond to explicit TDRAs. This may provide a one-to-one mapping between the DCI message 215 received at UE 115-*a* and the corresponding ACK/NACK transmitted by UE 115-*a*. That is, by refraining from inserting an ACK/NACK for an implicit TDRA implicitly indicated by the DCI message 215, UE 115-*a* may avoid transmitting multiple ACK/NACKs for downlink data repetitions 225 scheduled by the same DCI message 215.

In the second example described herein (e.g., implementing a total TDRA indication in the DCI message 215), UE 115-*a* may determine the HARQ-ACK information 230 based on the total TDRA. For example, UE 115-*a* may generate a HARQ-ACK codebook by inserting an ACK/NACK for a PDSCH occasion corresponding to the total TDRA. If the total TDRA spans multiple slots, UE 115-*a* may insert the ACK/NACK for the PDSCH occasion in the latest slot in the time domain.

For some codebooks, a UE 115 or base station 105 may determine the PDSCH occasions based on a TDD configuration or pattern. For example, the UE 115 or base station 105 may remove a TDRA candidate from the list of TDRA candidates if at least one symbol of the TDRA candidate is configured for uplink. However, in other cases, a device may not remove a TDRA candidate with at least one uplink symbol if nominal candidates can be split into multiple repetitions based on downlink/uplink switching. For example, if UE 115-*a* supports splitting a nominal repetition into multiple actual repetitions due to downlink/uplink switching, UE 115-*a* may handle a TDRA candidate with one or more symbols configured as uplink. In a first example, UE 115-*a* may not remove a TDRA candidate with a symbol configured for uplink. In a second example, UE 115-*a* may remove a TDRA candidate if all of the symbols of the TDRA candidate are configured for uplink, and otherwise may maintain the TDRA candidate. In a third example, UE 115-*a* may remove a TDRA candidate if, after omitting the symbols configured for uplink, no two consecutive symbols remain configured for downlink, and otherwise may maintain the TDRA candidate. That is, UE 115-*a* may remove the TDRA candidate if no valid mini-slots remain for actual candidates after splitting. Base station 105-*a* may implement the same rules.

In some other cases, base station 105-*a* may schedule TDRAs such that no repetitions conflict with the TDD pattern. For example, the TDRA indicated in the DCI 215 (whether explicit or total) may not include any symbols configured for uplink. This scheduling may be implemented by the network, and UE 115-*a* may remove TDRA candidates based on the TDD pattern conflict (e.g., due to the scheduling handled by base station 105-*a*).

FIGS. 3A through 3E illustrate examples of TDRAs 300 that support TDRA for downlink data repetitions in accordance with aspects of the present disclosure. In some cases, the TDRA field in a DCI message may indicate time domain resources for one repetition of a set of multiple downlink data repetitions (e.g., as described herein with reference to FIG. 2). This may be referred to as an "explicit" TDRA 310 for the one repetition. In some examples, this TDRA may be the first TDRA in the time domain. In some other examples, this TDRA may be the last TDRA in the time domain. A base station 105 transmitting the DCI and a UE 115 receiving the DCI may be configured to determine whether the explicit TDRA 310 corresponds to the first or last TDRA in the time domain. The other repetitions of the set of multiple downlink data repetitions may have the same length as the explicit TDRA 310 and may be contiguous with the explicit TDRA 310. For example, based on whether the explicit TDRA 310 is the first or last in the time domain, the other TDRAs may immediately follow or immediately precede the explicit TDRA in sequential fashion. As such, the UE 115 receiving the explicit TDRA 310 may implicitly derive the other TDRA(s) (i.e., the "implicit" TDRA(s) 315) from the timing of the explicit TDRA 310 (e.g., the starting symbol and the length) and the number of repetitions.

In some cases, the base station 105 may separately indicate the number of repetitions to the UE 115 (e.g., dynamically through DCI, semi-statically through radio resource control (RRC) configuration, etc.). Each repetition (e.g., the indicated number of repetitions, the repetition explicitly indicated in the TDRA field, etc.) may be an actual repetition or a nominal repetition. A nominal repetition may be further split into multiple actual repetitions based on a slot boundary, a downlink/uplink switching point, or both. An actual repetition may not be split into multiple repetitions (and, correspondingly, may not cross a slot boundary).

The base station 105 may schedule the set of downlink data repetitions based on one or more rules or configurations. In a first example, the base station 105 may schedule the repetitions such that all of the repetitions are within a same slot (e.g., a same TTI). In such an example, the explicit TDRA may be for the first repetition in the time domain or the last repetition in the time domain. In a second example, the base station 105 may schedule the repetitions such that the full set of repetitions may cross a slot boundary, while each individual repetition may not cross a slot boundary. In a third example, the base station 105 may schedule the repetitions such that a repetition may cross a slot boundary. A repetition crossing a slot boundary may correspond to a nominal repetition that may be split into multiple repetitions. In the second example, the third example, or both, the explicit TDRA may be for the last repetition in the time domain. For example, as different repetitions may be in different slots, the K1 value (e.g., the PDSCH-to-HARQ-feedback timing indicator) may indicate the HARQ-ACK delay starting from the last slot in time containing a repetition (e.g., to support sufficient processing time for a UE 115 to process the data and determine ACK/NACK feedback). Having the explicit TDRA correspond to the last repetition (and, correspondingly, the last slot) in time may support a sufficient timing delay for HARQ feedback for these examples and may simplify semi-static HARQ-ACK codebook construction. However, in some cases, the explicit TDRA may be for the first repetition in the time domain for the second and third examples.

Figure 3A:
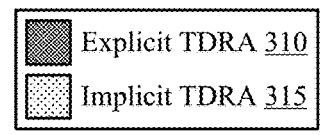
FIGS. 3A through 3E illustrate examples of TDRAs that support TDRA for downlink data repetitions in accordance with aspects of the present disclosure.
Figure 3A:
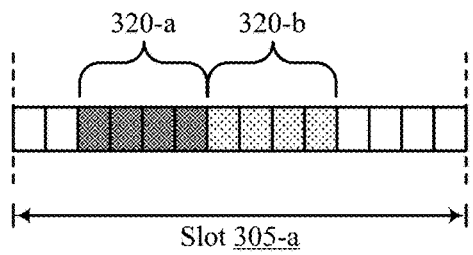

FIG. 3A illustrates an example of TDRAs 300-*a* confined to a single slot 305-*a*, where the explicit TDRA 310 is the first TDRA in the time domain. A UE 115 may receive a DCI message indicating an explicit TDRA 310 with a start symbol S=2 and a length L=4. Additionally, the UE 115 may determine that the set of downlink data repetitions includes two repetitions (e.g., based on a DCI message, an RRC message, a pre-configured value, etc.). Based on the explicit TDRA 310, the UE 115 may identify the timing resources for a first repetition 320-*a*. Furthermore, based on the timing for the explicit TDRA 310 and the number of repetitions, the UE 115 may determine an implicit TDRA 315 for a second repetition 320-*b*. That is, the UE 115 may determine that the second repetition 320-*b* follows the first repetition 320-*a* immediately in time and has the same length as the first repetition 320-*a*. In this way, the UE 115 may implicitly determine the TDRAs for the set of downlink data repetitions based on the indication of TDRA information for a single repetition.

Figure 3B:
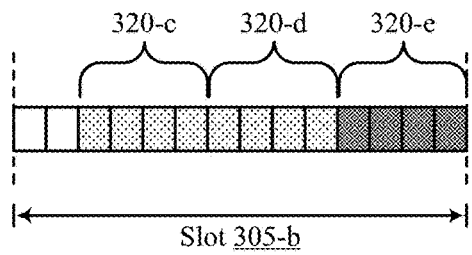

FIG. 3B illustrates an example of TDRAs 300-b confined to a single slot 305-b, where the explicit TDRA 310 is the last TDRA in the time domain. A UE 115 may receive a DCI message indicating an explicit TDRA 310 with a start symbol S=10 and a length L=4. Additionally, the UE 115 may determine that the set of downlink data repetitions includes three repetitions. Based on the explicit TDRA 310, the UE 115 may identify the timing resources for a first repetition 320-e. Furthermore, based on the timing for the explicit TDRA 310 and the number of repetitions, the UE 115 may determine implicit TDRAs 315 for a second repetition 320-d and a third repetition 320-c. For example, the second repetition 320-d may precede the first repetition 320-e immediately in time and have the same duration as the first repetition 320-e, while the third repetition 320-c may precede the second repetition 320-d immediately in time and also have the same duration.

Figure 3C:
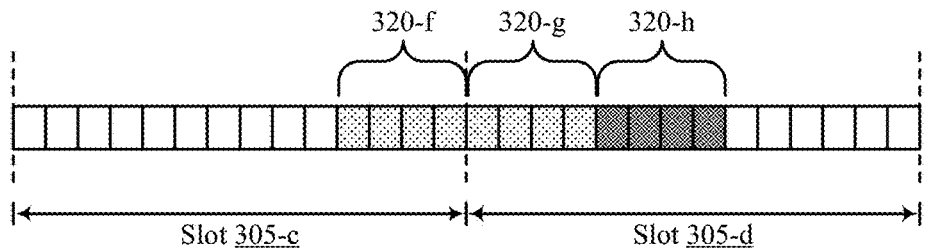

FIG. 3C illustrates an example of TDRAs 300-c spread across multiple slots 305, where the explicit TDRA 310 is the last TDRA in the time domain and does not cross a slot boundary. That is, a base station 105 scheduling the downlink data repetitions may schedule the repetitions such that S+L for the explicit TDRA 310 is no larger than 14. A UE 115 may receive a DCI message indicating the explicit TDRA 310 with a start symbol S=4 and a length L=4. Additionally, the UE 115 may determine that the set of downlink data repetitions includes three repetitions. Based on the explicit TDRA 310, the UE 115 may identify the timing resources for a first repetition 320-h. Furthermore, based on the timing for the explicit TDRA 310 and the number of repetitions, the UE 115 may determine implicit TDRAs 315 for a second repetition 320-g and a third repetition 320-f. For example, the second repetition 320-g may precede the first repetition 320-h immediately in time and have the same duration as the first repetition 320-h, while the third repetition 320-f may precede the second repetition 320-g immediately in time and also have the same duration. While the explicit TDRA 310 is scheduled for a slot 305-d, the set of downlink data repetitions may span across to a slot 305-c (e.g., a previous slot). As illustrated, no individual repetition may span a slot boundary, so the number of repetitions (i.e., three) may correspond to the actual number of repetitions.

Figure 3D:
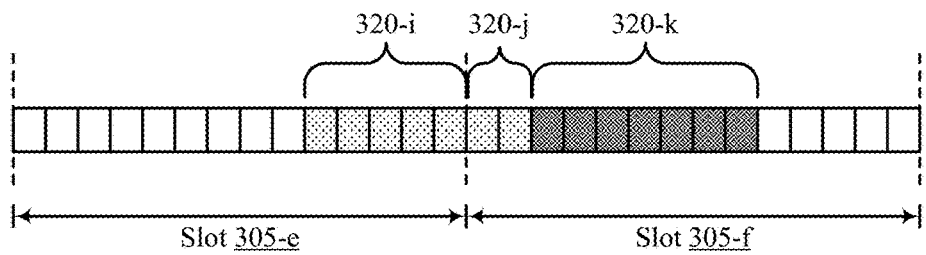

FIG. 3D illustrates an example of TDRAs 300-d spread across multiple slots 305, where the explicit TDRA 310 is the last TDRA in the time domain and does not cross a slot boundary. That is, a base station 105 scheduling the downlink data repetitions may schedule the repetitions such that S+L for the explicit TDRA 310 is no larger than 14. A UE 115 may receive a DCI message indicating the explicit TDRA 310 with a start symbol S=2 and a length L=7. Additionally, the UE 115 may determine that the set of downlink data repetitions includes two repetitions. Based on the explicit TDRA 310, the UE 115 may identify the timing resources for a first repetition 320-k. Furthermore, based on the timing for the explicit TDRA 310 and the number of repetitions, the UE 115 may determine implicit TDRAs 315 for a second repetition 320-j and a third repetition 320-i. That is, the UE 115 may determine a nominal repetition that directly precedes the repetition 320-k with the same length as the repetition 320-k. However, the UE 115 may identify that this nominal repetition spans a slot boundary between slot 305-e and slot 305-f. As such, the UE 115 may split the nominal repetition into multiple actual repetitions due to crossing the slot boundary, where the actual repetitions do not cross the slot boundary. These actual repetitions 320-i and 320-j may not have the same length as the explicit TDRA 310 due to the splitting procedure. Based on the configuration, the last repetition 320-k (i.e., the repetition corresponding to the explicit TDRA 310) may not cross a slot boundary, but different repetitions can be in different consecutive slots 305.

Figure 3E:
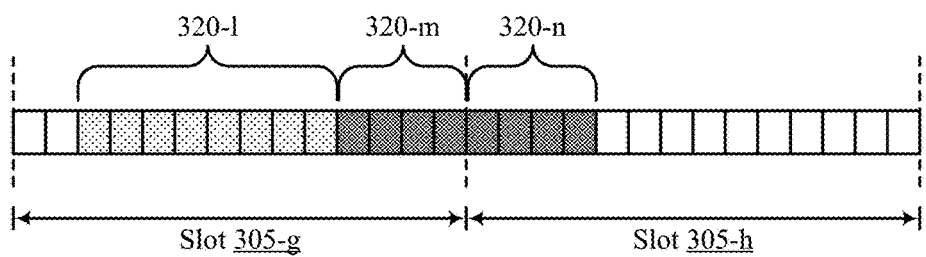

FIG. 3E illustrates an example of TDRAs 300-e spread across multiple slots 305, where the explicit TDRA 310 may cross a slot boundary. That is, a base station 105 scheduling the downlink data repetitions may schedule the repetitions such that S+L for the explicit TDRA 310 is larger than 14. A UE 115 may receive a DCI message indicating the explicit TDRA 310 with a start symbol S=10 and a length L=8. Additionally, the UE 115 may determine that the set of downlink data repetitions includes two repetitions. Based on the explicit TDRA 310, the UE 115 may identify that the explicit TDRA 310 crosses the slot boundary between slot 305-g and slot 305-h. That is, the repetition corresponding to the explicit TDRA 310 may be an example of a nominal repetition, and the UE 115 may split the nominal repetition into actual repetitions due to crossing the slot boundary. The UE 115 may determine actual repetitions 320-m and 320-n based on the explicit TDRA 310 (such that the actual repetitions do not cross a slot boundary) and may determine an implicit TDRA 315 for repetition 320-1 based on the explicit TDRA 310 and the indicated number of repetitions. In this example, the indicated number of repetitions is nominal, and the actual number of repetitions is greater than the indicated number of repetitions.

Figure 4:
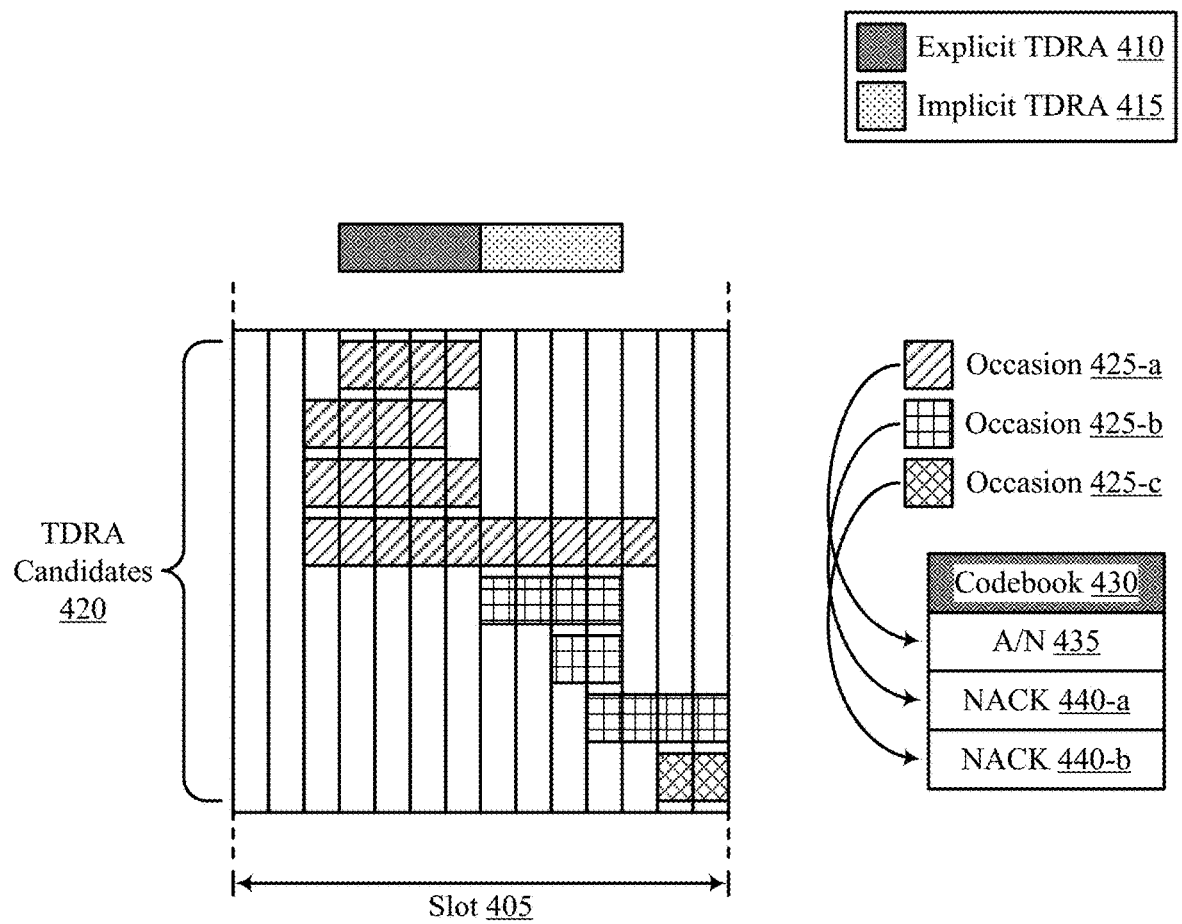
FIGS. 4 through 6 illustrate examples of codebook generation processes that support TDRA for downlink data repetitions in accordance with aspects of the present disclosure.

FIG. 4 illustrates an example of a codebook generation process 400 that supports TDRA for downlink data repetitions in accordance with aspects of the present disclosure. The codebook generation process 400 may be performed by a UE 115 as described with reference to FIGS. 1 and 2. For example, the UE 115 may support a set of TDRA candidates 420 for a slot 405. This set of TDRA candidates 420 (e.g., eight TDRA candidates) may correspond to three downlink data occasions 425 (e.g., PDSCH occasions 425). For example, the UE 115 may partition the TDRA candidates 420 into subgroups. The UE 115 may identify the TDRA candidate 420 that ends earliest in the slot 405 (i.e., the second TDRA candidate 420 ending in symbol 5) and may identify each other TDRA candidate 420 overlapping in at least one symbol with this TDRA candidate 420. These identified TDRA candidates 420 may correspond to the first PDSCH occasion 425-a. The UE 115 may then identify, from the remaining candidates not yet assigned to a PDSCH occasion 425, the TDRA candidate 420 that ends earliest in the slot 405 (i.e., the fifth and sixth TDRA candidates 420 ending in symbol 10). The UE 15 may identify each other TDRA candidate 420 overlapping in at least one symbol with these TDRA candidates 420 and may assign these TDRA candidates 420 to PDSCH occasion 425-b. The UE 115 may continue this process until all TDRA candidates 420 are assigned to a PDSCH occasion 425. In this way, the UE 115 may determine PDSCH occasion 425-a (corresponding to the first four TDRA candidates 420), PDSCH occasion 425-b (corresponding to the next three TDRA candidates 420), and PDSCH occasion 425-c (corresponding to the last TDRA candidate 420).

The UE 115 may receive a DCI message indicating an explicit TDRA 410 and may determine an implicit TDRA 415 based on the explicit TDRA 410 and a number of repetitions. The set of TDRAs may be confined to a single slot 405. For example, the UE 115 may receive an explicit TDRA 410 with a start symbol S=3 and a length L=4, where the explicit TDRA 410 corresponds to the first repetition in the time domain. This explicit TDRA 410 may correspond to a TDRA candidate 420 in PDSCH occasion 425-*a*. To create the HARQ-ACK codebook 430 for feedback (e.g., a semi-static codebook) in that slot 405, the UE 115 may use the PDSCH occasion 425-*a* for the explicit TDRA 410 repetition. That is, when mini-slot repetition is transmitted by a base station 105, the ACK/NACK 435 in the codebook 430 may correspond to the explicit TDRA 410. The UE 115 may insert the ACK/NACK 435 in the codebook 430 at a location corresponding to PDSCH occasion 425-*a* (e.g., as the explicit TDRA 410 is scheduled in PDSCH occasion 425-*a*). For other PDSCH occasions 425 within the slot 405 that do not correspond to explicit TDRA 410, the UE 115 may insert dummy NACKs 440. For example, the UE 115 may insert dummy NACK 440-*a* in the codebook 430 at a location corresponding to PDSCH occasion 425-*b* and dummy NACK 440-*b* in the codebook 430 at a location corresponding to PDSCH occasion 425-*c*. As illustrated, even though the UE 115 may receive the implicit TDRA 415 in occasion 425-*b*, the UE 115 may send a NACK (i.e., a dummy NACK 440-*a*) for occasion 425-*b* to support reduced complexity and a one-to-one mapping between the DCI message and an ACK/NACK 435. The UE 115 may use the HARQ-ACK codebook 430 to transmit feedback information to the base station 105 sending the downlink data repetitions.

Figure 5:
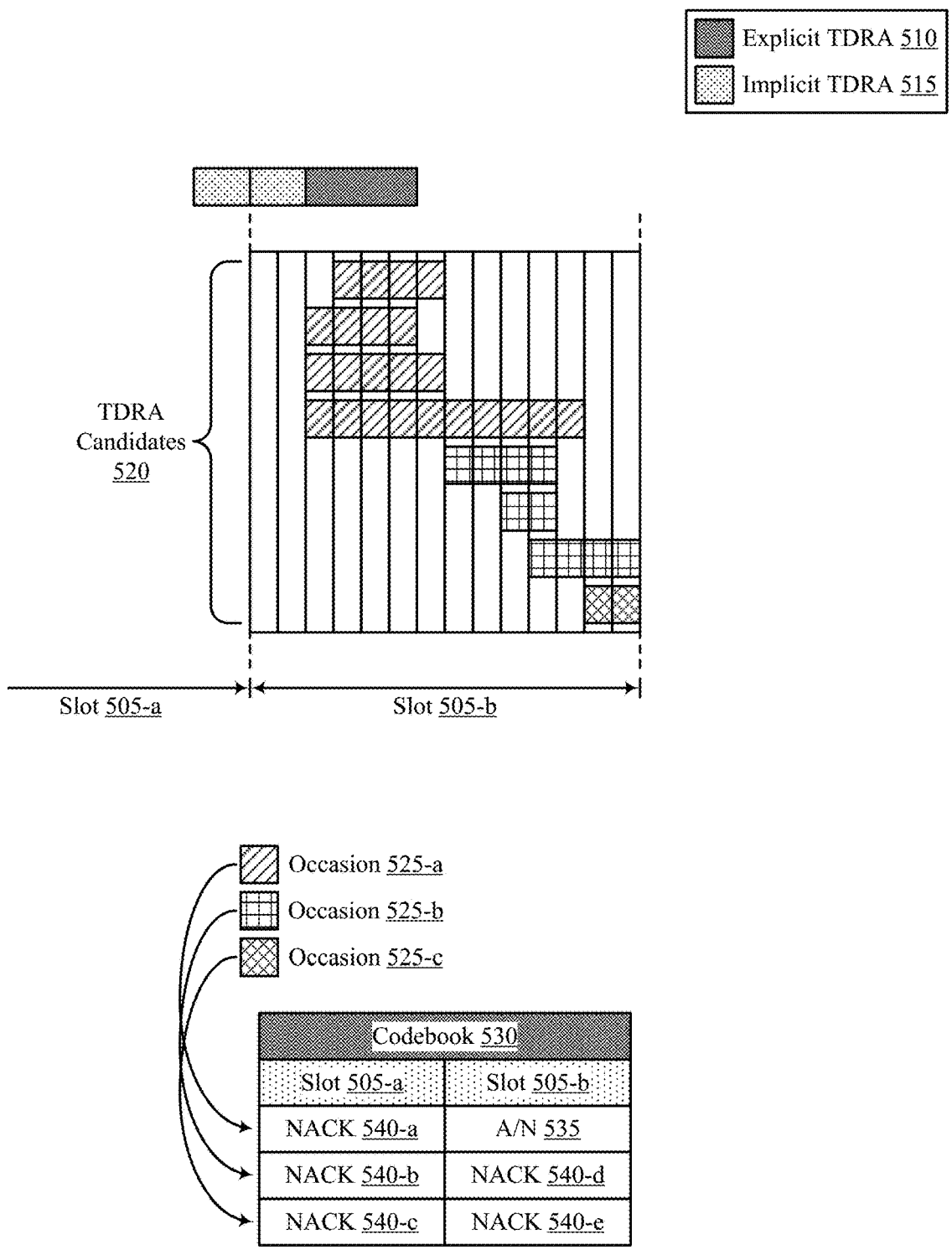

FIG. 5 illustrates an example of a codebook generation process 500 that supports TDRA for downlink data repetitions in accordance with aspects of the present disclosure. The codebook generation process 500 may be performed by a UE 115 as described with reference to FIGS. 1 and 2. For example, the UE 115 may support a set of TDRA candidates 520 for a slot 505-*b*. This set of TDRA candidates 520 (e.g., eight TDRA candidates) may correspond to three downlink data occasions 525 (e.g., PDSCH occasions 525).

The UE 115 may receive a DCI message indicating an explicit TDRA 510 and may determine one or more implicit TDRAs 515 based on the explicit TDRA 510 and a number of repetitions. The set of TDRAs may cross a slot boundary into a second slot 505-*a* (e.g., a preceding slot). For example, the UE 115 may receive an explicit TDRA 510 with a start symbol S=2 and a length L=4, where the explicit TDRA 510 corresponds to the last repetition in the time domain. The UE 115 may determine a nominal implicit TDRA preceding the explicit TDRA 510 that crosses the slot boundary and may split the nominal implicit TDRA into actual implicit TDRAs 515 that do not cross the slot boundary. The set of downlink data repetitions spans slot 505-*a* and slot 505-*b*.

The explicit TDRA 510 may correspond to a TDRA candidate 520 in PDSCH occasion 525-*a*. To create the HARQ-ACK codebook 530 for feedback (e.g., a semi-static codebook), the UE 115 may use the PDSCH occasion 525-*a* for the explicit TDRA 510 repetition. That is, when mini-slot repetition is transmitted by a base station 105, the ACK/NACK 535 in the codebook 530 may correspond to the explicit TDRA 510. As the downlink data repetitions span multiple slots, the K1 value indicated in the DCI message K1 (e.g., PDSCH-to-HARQ_feedback timing indicator) field may start from the slot 505 (e.g., slot 505-*b*) containing the last repetition in time. The explicit TDRA 510 (i.e., corresponding to the last repetition in time) may not cross a slot boundary. As such, the UE 115 may insert the ACK/NACK 535 in the codebook 530 at a location corresponding to PDSCH occasion 525-*a* in the last slot 505-*b* (e.g., as the explicit TDRA 510 is scheduled in PDSCH occasion 525-*a* of slot 505-*b*). For other PDSCH occasions 525 within the slots 505 that do not correspond to explicit TDRA 510, the UE 115 may insert dummy NACKs 540. For example, the UE 115 may insert dummy NACKs 540-*a*, 540-*b*, and 540-*c* for the PDSCH occasions 525 in slot 505-*a* and may insert dummy NACKs 540-*d* and 540-*e* for PDSCH occasions 525-*b* and 525-*c* for slot 505-*b*. The UE 115 may use the HARQ-ACK codebook 530 to transmit feedback information to the base station 105 sending the downlink data repetitions.

Figure 6:
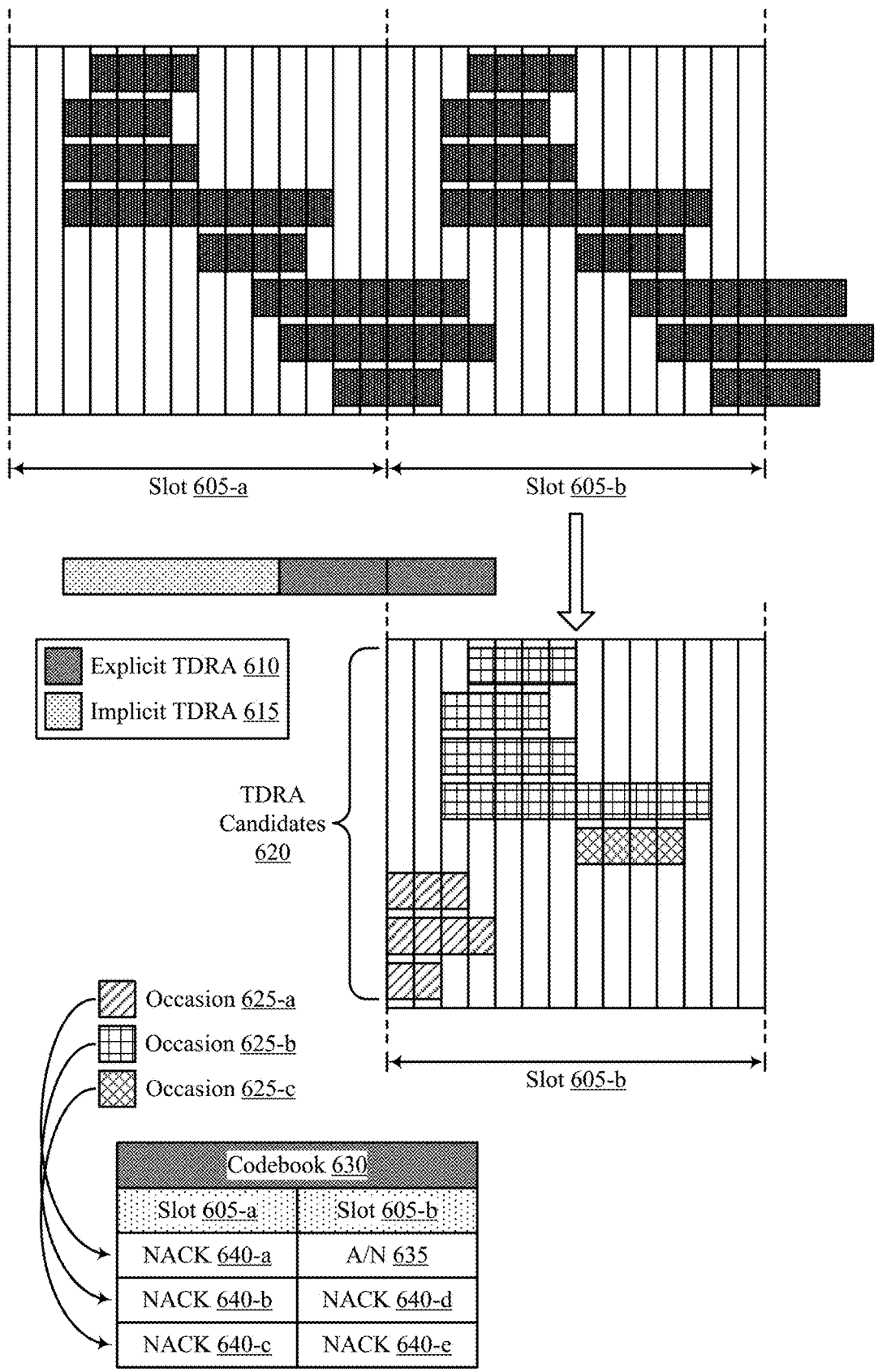

FIG. 6 illustrates an example of a codebook generation process 600 that supports TDRA for downlink data repetitions in accordance with aspects of the present disclosure. The codebook generation process 600 may be performed by a UE 115 as described with reference to FIGS. 1 and 2. The UE 115 may receive a DCI message indicating an explicit TDRA 610 and may determine one or more implicit TDRAs 615 based on the explicit TDRA 610 and a number of repetitions. The explicit TDRA 610 may be the last repetition of the set of downlink data repetitions in the time domain. Accordingly, the K1 (e.g., PDSCH-to-HARQ_feedback timing indicator) field may start from the slot 605 containing the last repetition in time. If the explicit TDRA 610 crosses a slot boundary, the K1 value may start from the slot containing the last actual repetition in time (e.g., after splitting the explicit TDRA 610 into multiple actual repetitions due to crossing the boundary).

The UE 115 may determine modified TDRA candidates 620 based on candidates that potentially cross a slot boundary (e.g., by considering two or more consecutive slots 605). For example, the UE 115 may include TDRA candidates 620 in a set of TDRA candidates 620 corresponding to potential timing resources for the last actual repetitions after a splitting procedure. For example, as illustrated, slot 605-*a* may include TDRA candidates 620 that may cross the slot boundary into slot 605-*b*. The portions of these candidates that cross into slot 605-*b* may be added as TDRA candidates 620 in slot 605-*b*. These may be the TDRA candidates 620 corresponding to PDSCH occasion 625-*a*. That is, the possible locations for the last actual repetitions (after splitting) in a single slot 605-*b* may be added to the possible TDRA candidates 620 for the purpose of HARQ-ACK codebook 630 generation. The additions of these TDRA candidates 620 may be based on original TDRA candidates 620 with S+L>14 starting in the previous slot 605-*a*, where the added TDRA candidates 620 correspond to the last actual repetitions in the current slot 605-*b* due to crossing the slot boundary. Additionally, the original TDRA candidates 620 with S+L>14 starting in the current slot 605-*b* may be removed (as these would result in last actual repetitions in a subsequent slot). The resulting new set of TDRA candidates 620 may represent the possible timing locations for a last actual repetition and may be confined to a single slot 605. The UE 115 may identify the downlink data occasions 625 from the new set of TDRA candidates 620 (e.g., based on this modification procedure to handle splitting of explicit TDRAs 610). For example, the UE 115 may identify PDSCH occasion 625-*a*, PDSCH occasion 625-*b*, and PDSCH occasion 625-*c*.

The UE 115 may receive an explicit TDRA 610 with a start symbol S=10 and a length L=8, where the explicit TDRA 610 corresponds to the last repetition in the time domain. The UE 115 may determine that the explicit TDRA 610 is a nominal TDRA (e.g., based on the explicit TDRA 610 crossing the slot boundary between slot 605-*a* and slot 605-*b*) and may split the explicit TDRA 610 into separate actual TDRAs for separate repetitions. The UE 115 may additionally determine one or more implicit TDRAs 615 based on the explicit TDRA 610.

The UE 115 may create the semi-static codebook 630 based on the PDSCH occasion 625 for the explicit TDRA 610 repetition. For example, when mini-slot repetition is transmitted by a base station 105, the ACK/NACK 635 in the codebook 630 may correspond to the explicit TDRA 610. However, if the explicit TDRA 610 crosses a slot boundary (i.e., S+L>14 for the explicit TDRA 610), the portion of the explicit TDRA 610 in the last slot 605-b in the time domain is used. This portion may correspond to a new TDRA candidate 620 added to the set of TDRA candidates 620 for slot 605-b as described above. Accordingly, the UE 115 may insert an ACK/NACK 635 into the codebook 630 for the PDSCH occasion 625-a for slot 605-b based on the explicit TDRA 610 in the last slot 605-b. The UE 115 may insert dummy NACKs 640 for other PDSCH occasions 625 within the slot 605-b (and any other slots 605 corresponding to the same HARQ-ACK feedback message) that do not correspond to explicit TDRAs 610. For example, the UE 115 may insert dummy NACKs 640-a, 640-b, and 640-c for the PDSCH occasions 625 in slot 605-a and may insert dummy NACKs 640-d and 640-e for PDSCH occasions 625-b and 625-c for slot 605-b. The UE 115 may use the HARQ-ACK codebook 630 to transmit feedback information to the base station 105 sending the downlink data repetitions.

Figure 7:
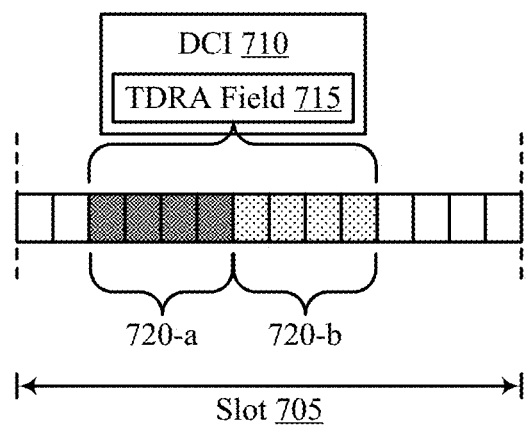
FIG. 7 illustrates an example of TDRAs that support TDRA for downlink data repetitions in accordance with aspects of the present disclosure.

FIG. 7 illustrates an example of TDRAs 700 that support TDRA for downlink data repetitions in accordance with aspects of the present disclosure. In some cases, the TDRA field 715 in a DCI message 710 may indicate time domain resources for all repetitions of a set of multiple downlink data repetitions (e.g., as described herein with reference to FIG. 2). This may be referred to as a "total" TDRA for the set of downlink data repetitions. A base station 105 may transmit the DCI message 710 indicating the total TDRA and a UE 115 may receive the DCI message 710, identify the total TDRA based on the TDRA field 715, and derive individual TDRAs for the downlink data repetitions 720. The base station 105 and UE 115 may be examples of the devices described with reference to FIGS. 1 and 2.

For example, the UE 115 may identify a total TDRA based on a start symbol S=2 and a length L=8 indicated in the TDRA field 715. The UE 115 may derive multiple repetitions 720 from the set of indicated symbols in the TDRA field 715 (e.g., the set of symbols comprising the total TDRA) based on one or more rules and/or configurations. In a first example, the UE 115 may identify repetitions 720 distributed evenly within the total TDRA. For example, for two repetitions, the first L/2 symbols may belong to a first repetition 720-a and the second L/2 symbols may belong to a second repetition 720-b. In a second example, the UE 115 may identify the repetitions 720 (e.g., the TDRAs for the repetitions 720) based on non-arbitrary lengths for each repetition 720. For example, the UE 115 may implement a rule for dividing the total TDRA into multiple repetitions 720 based on a limited set of symbol lengths (e.g., {2, 4, 7}) corresponding to valid mini-slot durations for downlink data repetitions 720. In a third example, the UE 115 may implement one or more additional or alternative rules for dividing the total TDRA into respective TDRAs for each repetition 720. The base station 105 scheduling the repetitions 720 may use the same set of rules in order to determine the total TDRA to indicate in the TDRA field 715 that accurately indicates the downlink data repetitions 720 to the UE 115. The first symbol in the time domain for each repetition 720 (e.g., after dividing the total TDRA) may be a DMRS symbol. In some cases, the number of repetitions 720 may be fixed, RRC configured, dynamically indicated in DCI signaling, or some combination thereof.

In some cases, for more scheduling control at the base station 105, the base station 105 may indicate the division across repetitions 720. For example, in the DCI message 710, the base station 105 may include an indication of how to divide the total TDRA (e.g., in the TDRA field 715 or in another DCI field). In a first example, the division across repetitions 720 may be indicated by a TDRA entry defining multiple repetitions (e.g., indicating symbols 2-5 for repetition 720-a and symbols 6-9 for repetition 720-b). In a second example, the division may be indicated by indicating separate start symbols for each repetition 720.

In some cases, the total TDRA may be contained within a slot 705. For example, if S+L≤14, all of the repetitions 720 may be within the same slot 705. In some such cases, a UE 115 may implement a HARQ-ACK codebook (e.g., a semi-static (type-1) HARQ-ACK codebook) based on the total TDRA. The UE 115 may insert an ACK/NACK indication into the codebook for the PDSCH occasion corresponding to the total TDRA, as the total TDRA contains all of the repetitions 720 and is within a single slot 705.

In some other cases, the total TDRA may span multiple slots 705 (not shown). For example, if S+L>14, the set of repetitions 720 may span across multiple slots 705. In some such cases, the UE 115 may implement a rule for dividing the total TDRA based on slot boundaries (e.g., such that, after dividing the total TDRA into the downlink data repetitions 720, no repetition 720 crosses a slot boundary). The UE 115 may implement a HARQ-ACK codebook (e.g., a semi-static (type-1) HARQ-ACK codebook) based on the total TDRA and a process similar to the process described herein with reference to FIG. 6. For example, the UE 115 may provide an ACK/NACK for the total TDRA corresponding to a last slot in the time domain for the set of slots. This ACK/NACK may be inserted for a PDSCH occasion added to a slot based on TDRA candidates crossing a slot boundary into the slot.

Figure 8:
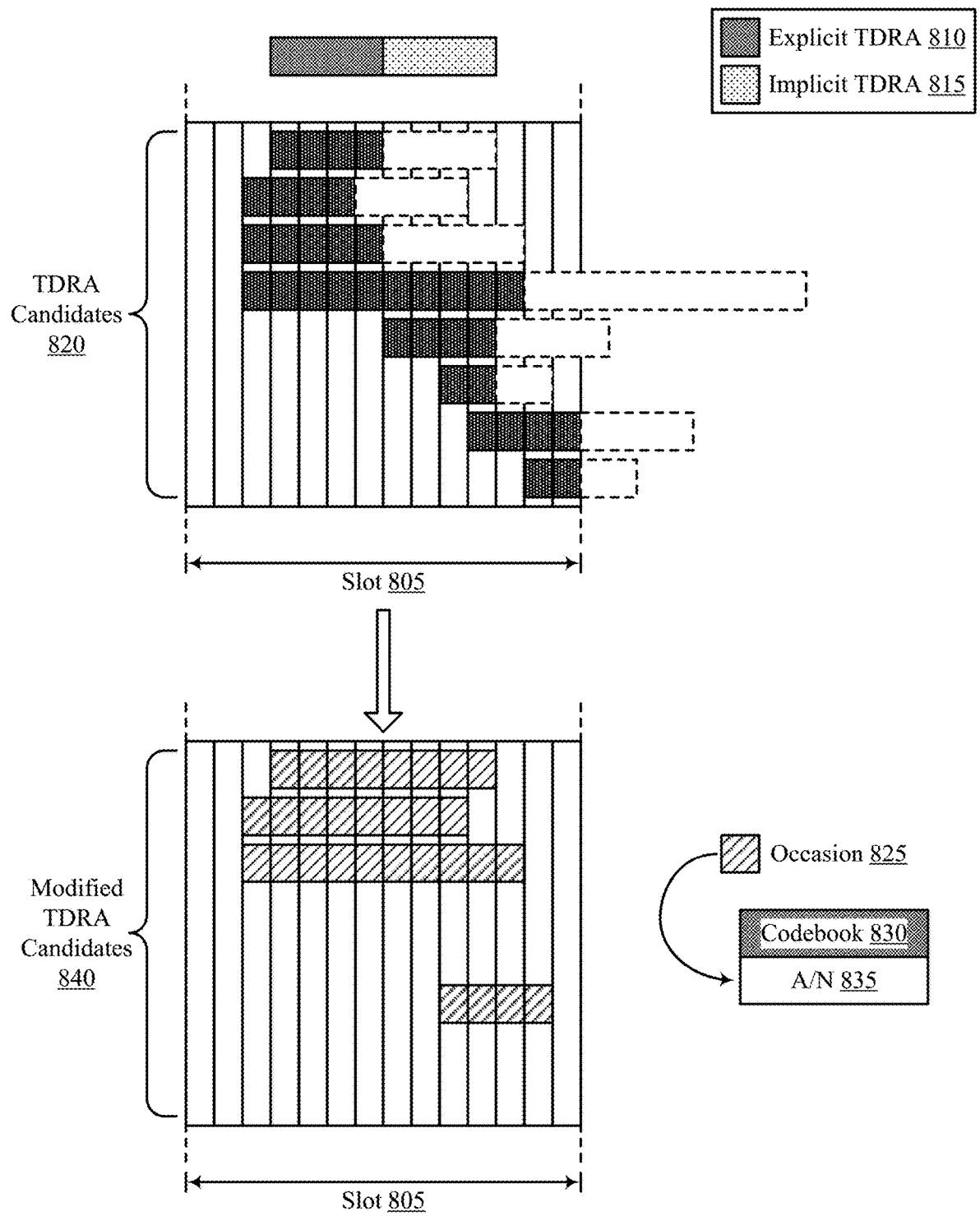
FIG. 8 illustrates an example of a codebook generation process that supports TDRA for downlink data repetitions in accordance with aspects of the present disclosure.

FIG. 8 illustrates an example of a codebook generation process 800 that supports TDRA for downlink data repetitions in accordance with aspects of the present disclosure. The codebook generation process 800 may be performed by a UE 115 as described with reference to FIGS. 1 and 2. The UE 115 may identify a semi-static number of repetitions for downlink data repetitions from a base station 105. For example, the number of repetitions may be pre-configured at the UE 115, semi-statically configured via RRC signaling, or a combination thereof (i.e., the number of repetitions does not change dynamically via DCI signaling). In some such cases, the UE 115 may implement techniques (e.g., optimizations) to reduce the number of downlink data occasions 825 tracked by the UE 115. Reducing the number of PDSCH occasions 825 may correspondingly reduce the number of redundant feedback bits when implementing explicit TDRAs 810.

In the slot 805 including the explicit TDRA 810, the UE 115 may extend the TDRA candidates 820 to additionally cover the implicit TDRA(s) 815 based on the explicit TDRA 810 and the number of repetitions (e.g., the fixed number of downlink data repetitions). Extending the TDRA candidates 820 may be based on the implicit TDRA rules implemented by the base station 105 transmitting the downlink data repetitions and the UE 115 receiving the downlink data repetitions.

If, as illustrated, the set of downlink data repetitions is confined to a single slot 805, the UE 115 may remove any extended TDRA candidates 820 that span into another slot.

The UE 115 may use a modified set of TDRA candidates 840 for determining PDSCH occasions 825, where the modified set includes the extended TDRA candidates that do not cross any slot boundary (e.g., based on a fixed repetition number of two). Based on the reduced number of TDRA candidates and the extended length of the TDRA candidates, the modified set of TDRA candidates 840 may correspond to a reduced set of PDSCH occasions 825. For example, the modified set of TDRA candidates 840 may correspond to a single PDSCH occasion 825. When the UE 115 receives an explicit TDRA 810, determines the implicit TDRA(s) 815, and receives the corresponding downlink data repetitions, the UE 115 may provide a single ACK/NACK 835 for the DCI message in the codebook 830 corresponding to the single PDSCH occasion 825. The codebook 830 may not include additional bits (e.g., dummy NACKs for other PDSCH occasions) based on reducing the number of PDSCH occasions 825 using the semi-static number of repetitions. The UE 115 may transmit a feedback message with a reduced payload based on the reduced size of the HARQ-ACK codebook 830.

In cases where the TDRA candidates 820 may span multiple slots, the UE 115 may use the last slot in the time domain for HARQ-ACK feedback. Extended TDRA candidates 820 (e.g., based on the explicit TDRA 810 and implicit TDRA(s) 815) that extend into slots after the last slot may be removed from the modified set of TDRA candidates 840, as these would not correspond to the last slot. The UE 115 may use the modified set of TDRA candidates 840 to calculate the PDSCH occasions 825 for these cases as well, effectively reducing the HARQ-ACK payload.

Figure 9:
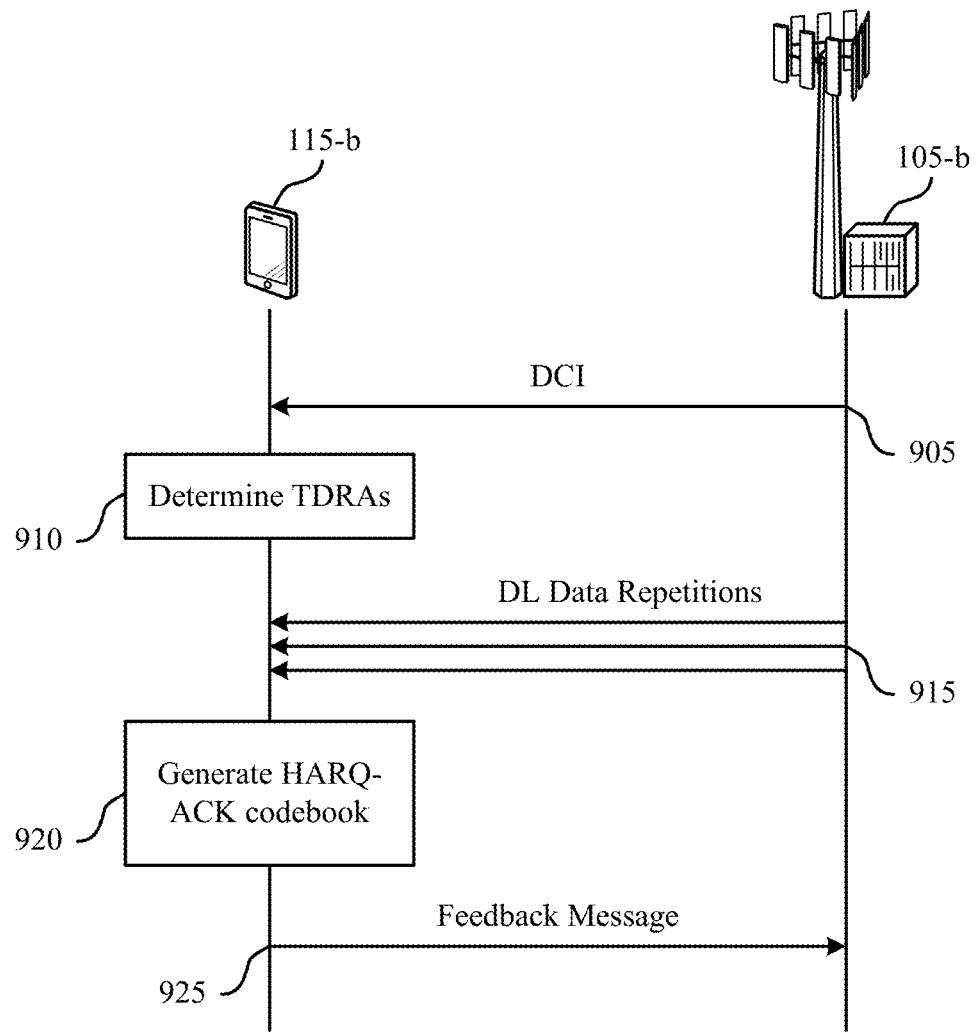
FIG. 9 illustrates an example of a process flow that supports TDRA for downlink data repetitions in accordance with aspects of the present disclosure.

FIG. 9 illustrates an example of a process flow 900 that supports TDRA for downlink data repetitions in accordance with aspects of the present disclosure. In some examples, the process flow 900 may include base station 105-*b* and UE 115-*b*, which may be examples of the corresponding devices described with reference to FIGS. 1 and 2. Base station 105-*b* and UE 115-*b* may support scheduling multiple downlink data repetitions using a single DCI message. Alternative examples of the following may be implemented, where some steps are performed in a different order than described or are not performed at all. In some cases, steps may include additional features not mentioned below, or further steps may be added.

At 905, base station 105-*b* may transmit a DCI message to UE 115-*b*. The DCI message may include a TDRA field. In a first implementation, the DCI message may indicate an explicit TDRA for a single repetition (e.g., a "first" repetition) of a downlink data transmission. In second implementation, the DCI message may indicate a total TDRA for a set of repetitions of a downlink data transmission.

At 910, UE 115-*b* may determine TDRAs based on the indicated TDRA in the TDRA field. In the first implementation, UE 115-*b* may determine one or more implicit TDRAs for one or more additional repetitions of the downlink data transmission based on the explicit TDRA (e.g., and a number of repetitions). In the second implementation, UE 115-*b* may determine a set of TDRAs for the set of repetitions of the downlink data transmission based on the total TDRA and the number of repetitions of the downlink data transmission.

At 915, base station 105-*b* may transmit the repetitions of the downlink data transmission to UE 115-*b*. UE 115-*b* may receive the repetitions of the downlink data transmission based on determining the TDRAs. In the first implementation, UE 115-*b* may receive, from base station 105-*b*, the "first" repetition of the downlink data transmission and the one or more additional repetitions of the downlink data transmission according to the explicit TDRA and the one or more implicit TDRAs. In the second implementation, UE 115-*b* may receive, from base station 105-*b*, the set of repetitions of the downlink data transmission according to the set of TDRAs.

At 920, UE 115-*b* may generate a HARQ-ACK codebook (e.g., a semi-static (type-1) HARQ-ACK codebook). In the first implementation, UE 115-*b* may generate the HARQ-ACK codebook based on the explicit TDRA (e.g., corresponding to a last slot in the time domain containing the repetitions of the downlink data transmission). In the second implementation, UE 115-*b* may generate the HARQ-ACK codebook based on the total TDRA. At 925, UE 115-*b* may transmit, to base station 105-*b*, a feedback message based on the HARQ-ACK codebook. Base station 105-*b* may receive the feedback message and may determine whether to retransmit the downlink data transmission to UE 115-*b* based on the feedback.

Figure 10:
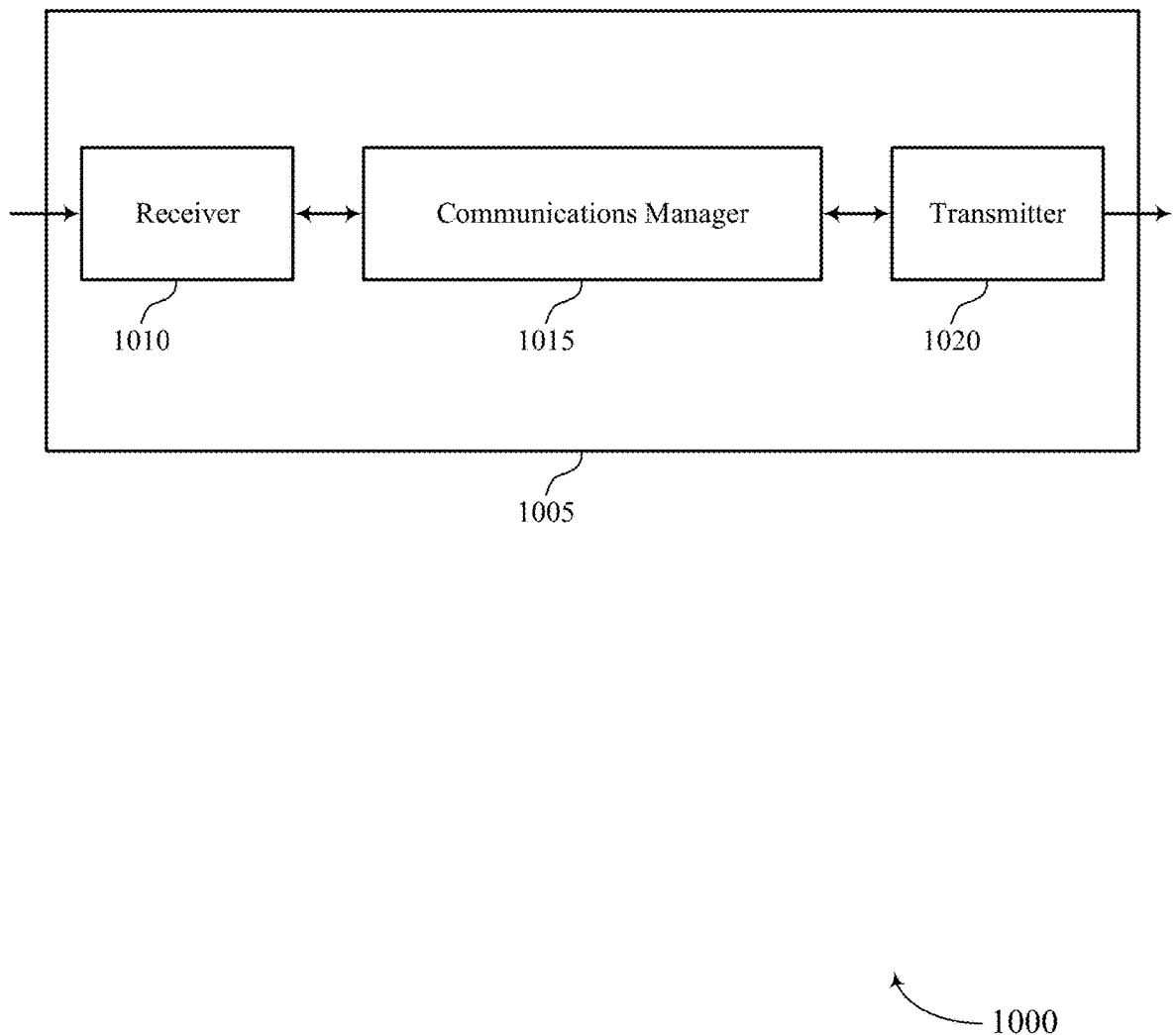
FIGS. 10 and 11 show block diagrams of devices that support TDRA for downlink data repetitions in accordance with aspects of the present disclosure.

FIG. 10 shows a block diagram 1000 of a device 1005 that supports TDRA for downlink data repetitions in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to TDRA for downlink data repetitions, etc.). Information may be passed on to other components of the device 1005. The receiver 1010 may be an example of aspects of the transceiver 1320 described with reference to FIG. 13. The receiver 1010 may utilize a single antenna or a set of antennas.

In some examples, the communications manager 1015 may receive, from a base station, a DCI message indicating an explicit TDRA for a first repetition of a downlink data transmission, determine one or more implicit TDRAs for one or more additional repetitions of the downlink data transmission based on the explicit TDRA, receive, from the base station, the first repetition of the downlink data transmission and the one or more additional repetitions of the downlink data transmission according to the explicit TDRA and the one or more implicit TDRAs, and transmit, to the base station, a feedback message based on the receiving and a HARQ-ACK codebook.

In some other examples, the communications manager 1015 may receive, from a base station, a DCI message indicating a total TDRA for a set of repetitions of a downlink data transmission, determine a set of TDRAs for the set of repetitions of the downlink data transmission based on the total TDRA and a number of repetitions for the downlink data transmission, receive, from the base station, the set of repetitions of the downlink data transmission according to the set of TDRAs, and transmit, to the base station, a feedback message based on the receiving and a HARQ-ACK codebook.

The actions performed by the communications manager 1015 as described herein may be implemented to realize one or more potential advantages. For example, determining multiple TDRAs (e.g., implicit TDRAs, TDRAs from a total TDRA, etc.) from a single DCI message may reduce control channel overhead. Additionally, determining the multiple TDRAs based on a single TDRA field may limit the payload size of the DCI, effectively utilizing the DCI fields. Furthermore, providing one ACK/NACK indication (e.g., in the feedback message) for the DCI message may reduce complexity by maintaining a one-to-one correlation between the ACK/NACK feedback and the DCI message.

Based on determining the downlink data TDRAs from the single DCI message, a processor of the UE 115 (e.g., a processor controlling the receiver 1010, the communications manager 1015, the transmitter 1020, etc.) may reduce processing resources used for downlink reception. For example, the UE 115 may receive a single DCI and decode a single TDRA field to determine multiple downlink data repetitions. As such, the UE 115 may reduce a number of times the processor ramps up processing power and turns on processing units to handle DCI reception and/or decoding. Furthermore, reducing the number of DCI messages may reduce the signaling overhead on the downlink control channel. Additionally, considering the TDRA indicated in the DCI message for HARQ feedback (e.g., and not the implicit TDRAs or each individual TDRA) may reduce processing resources used for HARQ feedback (e.g., as a single ACK/NACK is determined for a set of multiple downlink data repetitions).

The communications manager 1015 may be an example of aspects of the communications manager 1310 described herein. The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
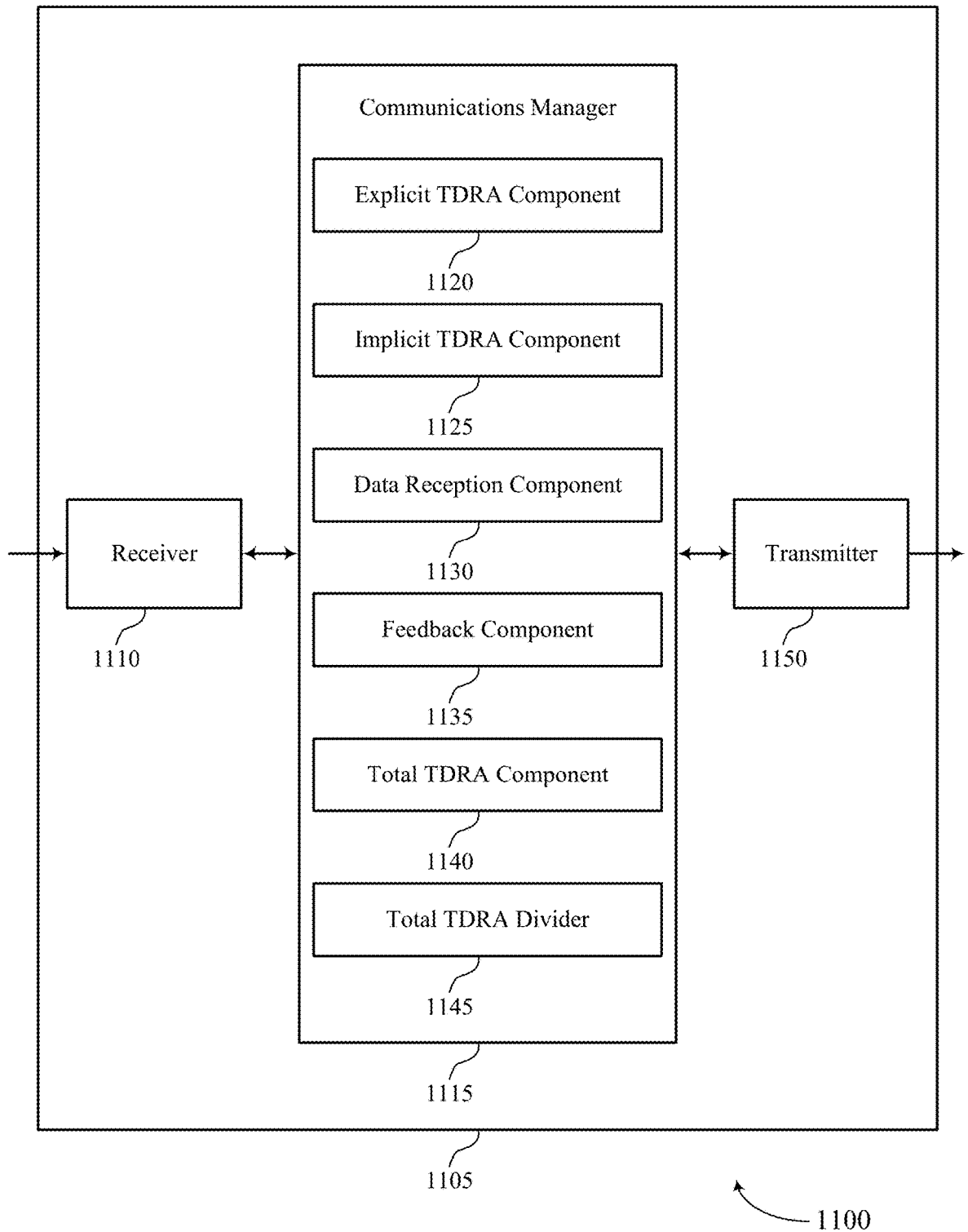

FIG. 11 shows a block diagram 1100 of a device 1105 that supports TDRA for downlink data repetitions in accordance with aspects of the present disclosure. The device 1105 may be an example of aspects of a device 1005 or a UE 115 as described herein. The device 1105 may include a receiver 1110, a communications manager 1115, and a transmitter 1150. The device 1105 may also include a processor. Each of these components may be in communication with one another (e.g., via one or more buses).

The receiver 1110 may receive information such as packets, user data, or control information associated with various information channels (e.g., control channels, data channels, and information related to TDRA for downlink data repetitions, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an explicit TDRA component 1120, an implicit TDRA component 1125, a data reception component 1130, a feedback component 1135, a total TDRA component 1140, a total TDRA divider 1145, or some combination thereof. The communications manager 1115 may be an example of aspects of the communications manager 1310 described herein.

In some cases, the explicit TDRA component 1120 may receive, from a base station, a DCI message indicating an explicit TDRA for a first repetition of a downlink data transmission. The implicit TDRA component 1125 may determine one or more implicit TDRAs for one or more additional repetitions of the downlink data transmission based on the explicit TDRA. The data reception component 1130 may receive, from the base station, the first repetition of the downlink data transmission and the one or more additional repetitions of the downlink data transmission according to the explicit TDRA and the one or more implicit TDRAs. The feedback component 1135 may transmit, to the base station, a feedback message based on the receiving and a HARQ-ACK codebook.

In some other cases, the total TDRA component 1140 may receive, from a base station, a DCI message indicating a total TDRA for a set of repetitions of a downlink data transmission. The total TDRA divider 1145 may determine a set of TDRAs for the set of repetitions of the downlink data transmission based on the total TDRA and a number of repetitions for the downlink data transmission. The data reception component 1130 may receive, from the base station, the set of repetitions of the downlink data transmission according to the set of TDRAs. The feedback component 1135 may transmit, to the base station, a feedback message based on the receiving and a HARQ-ACK codebook.

The transmitter 1150 may transmit signals generated by other components of the device 1105. In some examples, the transmitter 1150 may be collocated with a receiver 1110 in a transceiver module. For example, the transmitter 1150 may be an example of aspects of the transceiver 1320 described with reference to FIG. 13. The transmitter 1150 may utilize a single antenna or a set of antennas.

Figure 12:
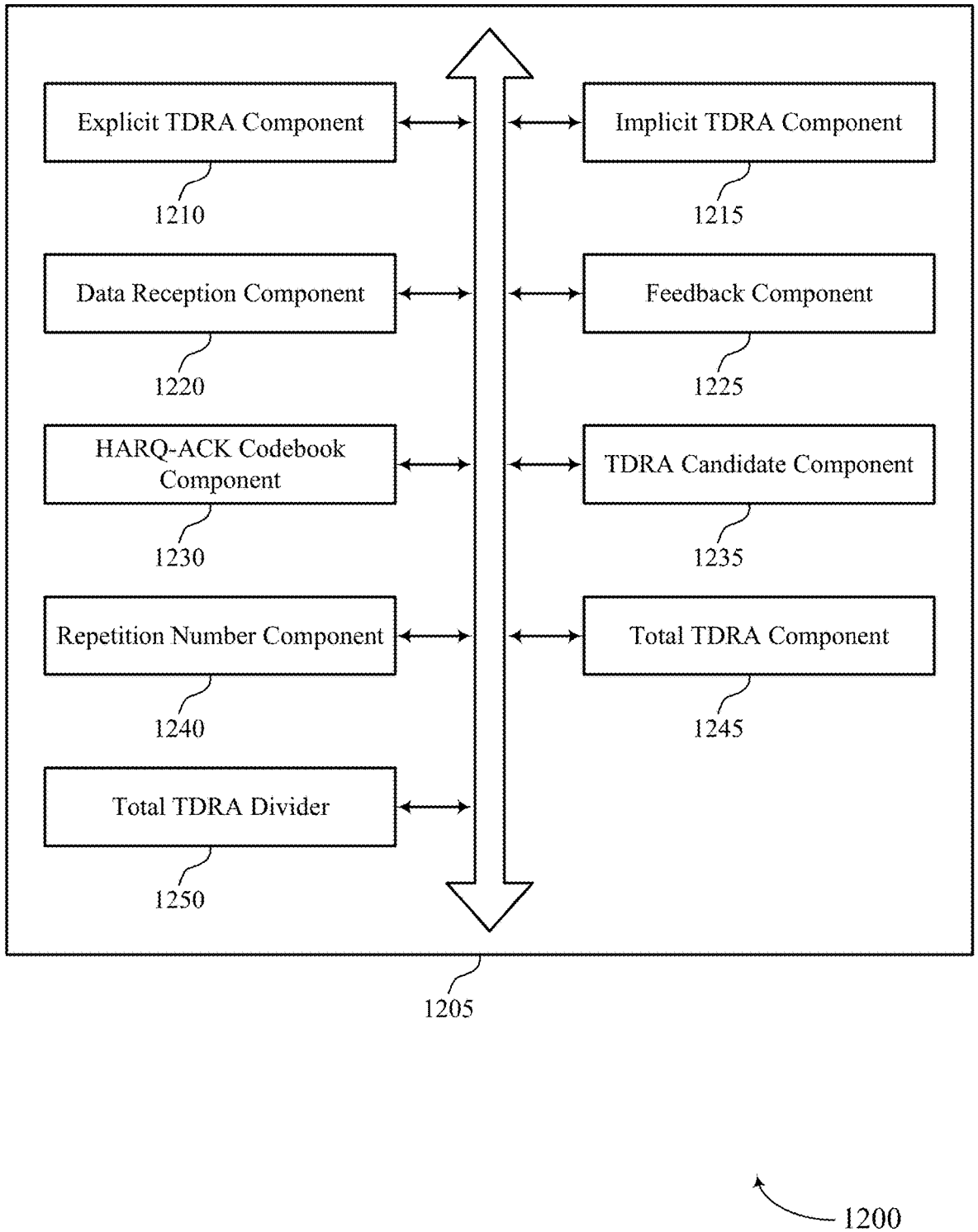
FIG. 12 shows a block diagram of a communications manager that supports TDRA for downlink data repetitions in accordance with aspects of the present disclosure.

FIG. 12 shows a block diagram 1200 of a communications manager 1205 that supports TDRA for downlink data repetitions in accordance with aspects of the present disclosure. The communications manager 1205 may be an example of aspects of a communications manager 1015, a communications manager 1115, or a communications manager 1310 described herein. The communications manager 1205 may include an explicit TDRA component 1210, an implicit TDRA component 1215, a data reception component 1220, a feedback component 1225, a HARQ-ACK codebook component 1230, a TDRA candidate component 1235, a repetition number component 1240, a total TDRA component 1245, a total TDRA divider 1250, or a combination thereof.

Each of these modules may communicate, directly or indirectly, with one another (e.g., via one or more buses).

In a first implementation, the explicit TDRA component 1210 may receive, from a base station, a DCI message indicating an explicit TDRA for a first repetition of a downlink data transmission. In some cases, the DCI message indicates the explicit TDRA according to a start symbol, an allocation length, a SLIV, a mapping type, a slot offset, or a combination thereof. In some examples, no symbol of the explicit TDRA is configured for uplink.

The implicit TDRA component 1215 may determine one or more implicit TDRAs for one or more additional repetitions of the downlink data transmission based on the explicit TDRA. In some cases, the explicit TDRA and the one or more implicit TDRAs are within a single slot. In some other cases, the explicit TDRA and the one or more implicit TDRAs span a set of slots. In some such cases, a feedback timing indicator may correspond to a last slot in time of the set of slots, where a feedback message is transmitted based on the feedback timing indicator. In some cases, the explicit TDRA spans the set of slots. In some such cases, the first repetition of the downlink data transmission is a first nominal repetition, and a repetition number component 1240 may determine a first actual repetition of the downlink data transmission in a first slot of the set of slots and a second actual repetition of the downlink data transmission in a second slot of the set of slots subsequent to the first slot based on the first nominal repetition, where the second slot is the last slot of the set of slots. In some cases, a TDRA candidate component 1235 may modify a set of TDRA candidates based on TDRA candidates that span across a slot boundary, where a HARQ-ACK codebook is based on the modified set of TDRA candidates.

In some cases, the first repetition of the downlink data transmission and each of the one or more additional repetitions of the downlink data transmission are a same length. In some cases, the explicit TDRA precedes the one or more implicit TDRAs in time. In some other cases, the explicit TDRA is subsequent to the one or more implicit TDRAs in time. In some cases, the explicit TDRA and the one or more implicit TDRAs are contiguous in time.

The data reception component 1220 may receive, from the base station, the first repetition of the downlink data transmission and the one or more additional repetitions of the downlink data transmission according to the explicit TDRA and the one or more implicit TDRAs. The feedback component 1225 may transmit, to the base station, a feedback message based on the receiving and a HARQ-ACK codebook.

The HARQ-ACK codebook component 1230 may generate the HARQ-ACK codebook based on the explicit TDRA and the receiving. In some examples, generating the HARQ-ACK codebook may involve the HARQ-ACK codebook component 1230 inserting, for a first downlink data occasion of the HARQ-ACK codebook, an ACK/NACK indication for the downlink data transmission based on the explicit TDRA and the receiving. In some examples, generating the HARQ-ACK codebook may further involve the HARQ-ACK codebook component 1230 inserting, for one or more additional downlink data occasions of the HARQ-ACK codebook, one or more dummy NACK indications for the downlink data transmission based on no explicit TDRA corresponding to the one or more additional downlink data occasions. Additionally or alternatively, if the feedback message is transmitted in a first slot for feedback, the HARQ-ACK codebook component 1230 may insert, for one or more additional downlink data occasions of the HARQ-ACK codebook, one or more dummy NACK indications for the downlink data transmission based on an additional explicit TDRA corresponding to at least one of the one or more additional downlink data occasions indicating a second slot for feedback that is different from the first slot for feedback.

In some cases, a size of the HARQ-ACK codebook is based on a set of TDRA candidates, where the explicit TDRA corresponds to a candidate of the set of TDRA candidates and downlink data occasions of the HARQ-ACK codebook are based on the set of TDRA candidates. In some cases, the HARQ-ACK codebook is an example of a semi-static codebook, a type-1 codebook, or both.

In some examples, the TDRA candidate component 1235 may refrain from including a TDRA candidate in the set of TDRA candidates if a symbol of the TDRA candidate is configured for uplink, all symbols of the TDRA candidate are configured for uplink, at most one consecutive symbol of the TDRA candidate is configured for downlink, or a combination thereof. In some examples, the number of repetitions for the downlink data transmission is semi-statically configured, and the TDRA candidate component 1235 may determine the set of TDRA candidates to cover both explicit TDRA candidates and corresponding implicit TDRA candidates based on the number of repetitions.

The repetition number component 1240 may identify a number of repetitions for the downlink data transmission, where determining the one or more implicit TDRAs is based on the number of repetitions. In some cases, the number of repetitions is identified based on the DCI message, an RRC configuration, or a combination thereof. In some examples, the number of repetitions is a nominal number of repetitions, and the repetition number component 1240 may determine an actual number of repetitions based on the nominal number of repetitions and a slot boundary, an uplink/downlink switching point, or a combination thereof, where determining the one or more implicit TDRAs is based on the actual number of repetitions.

In a second implementation, the total TDRA component 1245 may receive, from a base station, a DCI message indicating a total TDRA for a set of repetitions of a downlink data transmission. In some examples, no symbol of the total TDRA is configured for uplink. In some cases, the total TDRA is within a single slot. In some other cases, the total TDRA spans a set of slots. The DCI message may indicate the total TDRA according to a start symbol, an allocation length, an SLIV, a mapping type, a slot offset, or a combination thereof.

The total TDRA divider 1250 may determine a set of TDRAs for the set of repetitions of the downlink data transmission based on the total TDRA and a number of repetitions for the downlink data transmission. In some cases, the set of TDRAs is determined further based on a set of possible sizes for each TDRA of the set of TDRAs, an equal distribution of the set of TDRAs in the total TDRA, or a combination thereof. In some cases, a first symbol in time of each TDRA of the set of TDRAs corresponds to a DMRS symbol.

The data reception component 1220 may receive, from the base station, the set of repetitions of the downlink data transmission according to the set of TDRAs. The feedback component 1225 may transmit, to the base station, a feedback message based on the receiving and a HARQ-ACK codebook.

In some examples, the repetition number component 1240 may identify the number of repetitions for the downlink data transmission based on the DCI message, an RRC configuration, a fixed repetition value, or a combination thereof.

In some examples, the TDRA candidate component 1235 may determine a set of TDRA candidates based on an uplink symbol, where the HARQ-ACK codebook is based on the determined set of TDRA candidates. In some cases, determining the set of TDRA candidates may involve the TDRA candidate component 1235 refraining from including a TDRA candidate in the set of TDRA candidates if a symbol of the TDRA candidate is configured for uplink, all symbols of the TDRA candidate are configured for uplink, at most one consecutive symbol of the TDRA candidate is configured for downlink, or a combination thereof.

In some cases, if the total TDRA spans multiple slots, the set of TDRAs may be determined further based on a slot boundary of the set of slots. In some cases, a feedback timing indicator may correspond to a last slot in time of the set of slots, where the feedback message is transmitted based on the feedback timing indicator.

Figure 13:
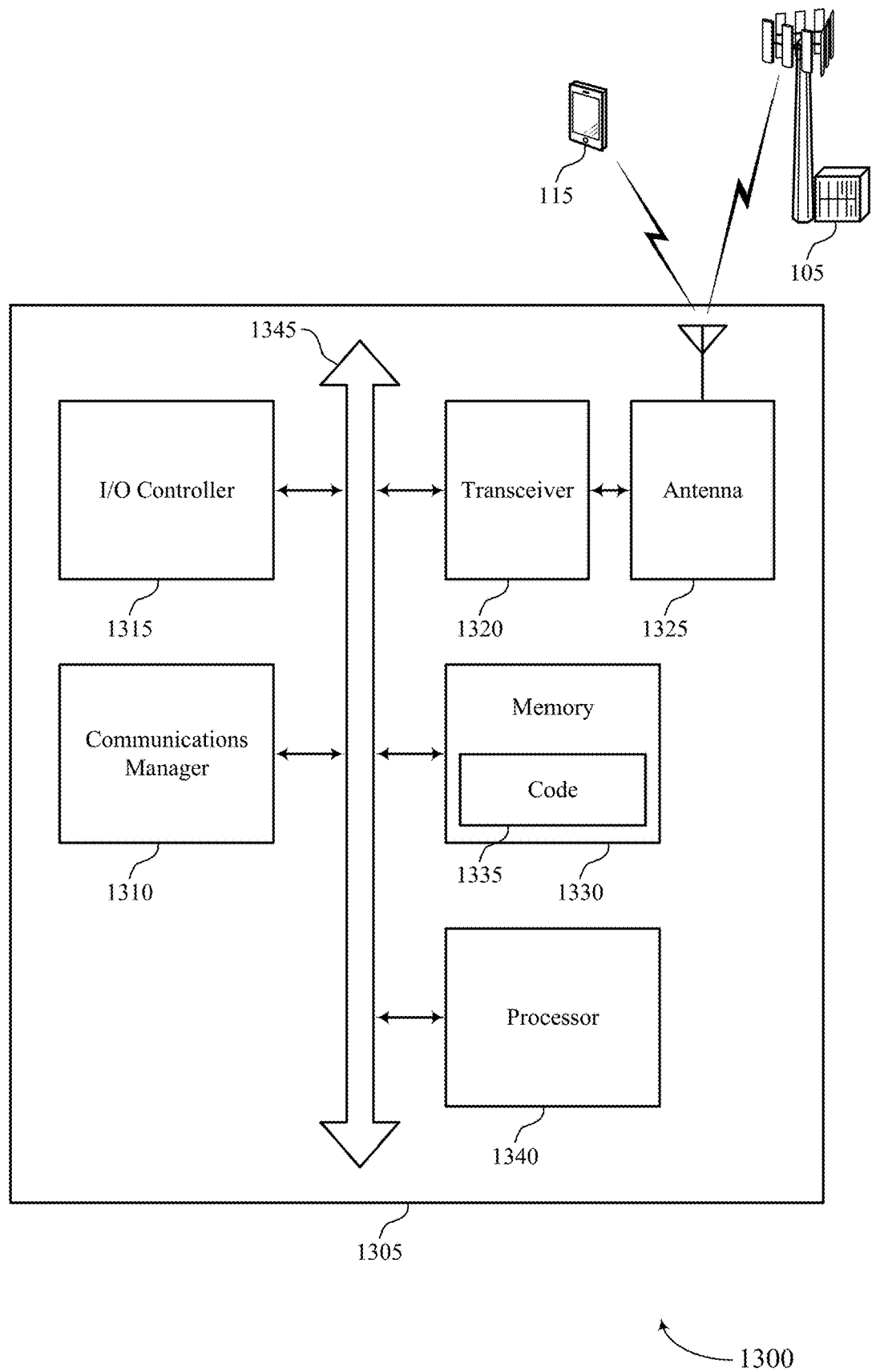
FIG. 13 shows a diagram of a system including a device that supports TDRA for downlink data repetitions in accordance with aspects of the present disclosure.

FIG. 13 shows a diagram of a system 1300 including a device 1305 that supports TDRA for downlink data repetitions in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may receive, from a base station, a DCI message indicating an explicit TDRA for a first repetition of a downlink data transmission, determine one or more implicit TDRAs for one or more additional repetitions of the downlink data transmission based on the explicit TDRA, receive, from the base station, the first repetition of the downlink data transmission and the one or more additional repetitions of the downlink data transmission according to the explicit TDRA and the one or more implicit TDRAs, and transmit, to the base station, a feedback message based on the receiving and a HARQ-ACK codebook.

Additionally or alternatively, the communications manager 1310 may receive, from a base station, a DCI message indicating a total TDRA for a set of repetitions of a downlink data transmission, determine a set of TDRAs for the set of repetitions of the downlink data transmission based on the total TDRA and a number of repetitions for the downlink data transmission, receive, from the base station, the set of repetitions of the downlink data transmission according to the set of TDRAs, and transmit, to the base station, a feedback message based on the receiving and a HARQ-ACK codebook.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code 1335 including instructions that, when executed, cause the processor to perform various functions described herein. In some cases, the memory 1330 may contain, among other things, a basic I/O system (BIOS) which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting TDRA for downlink data repetitions).

Figure 14:
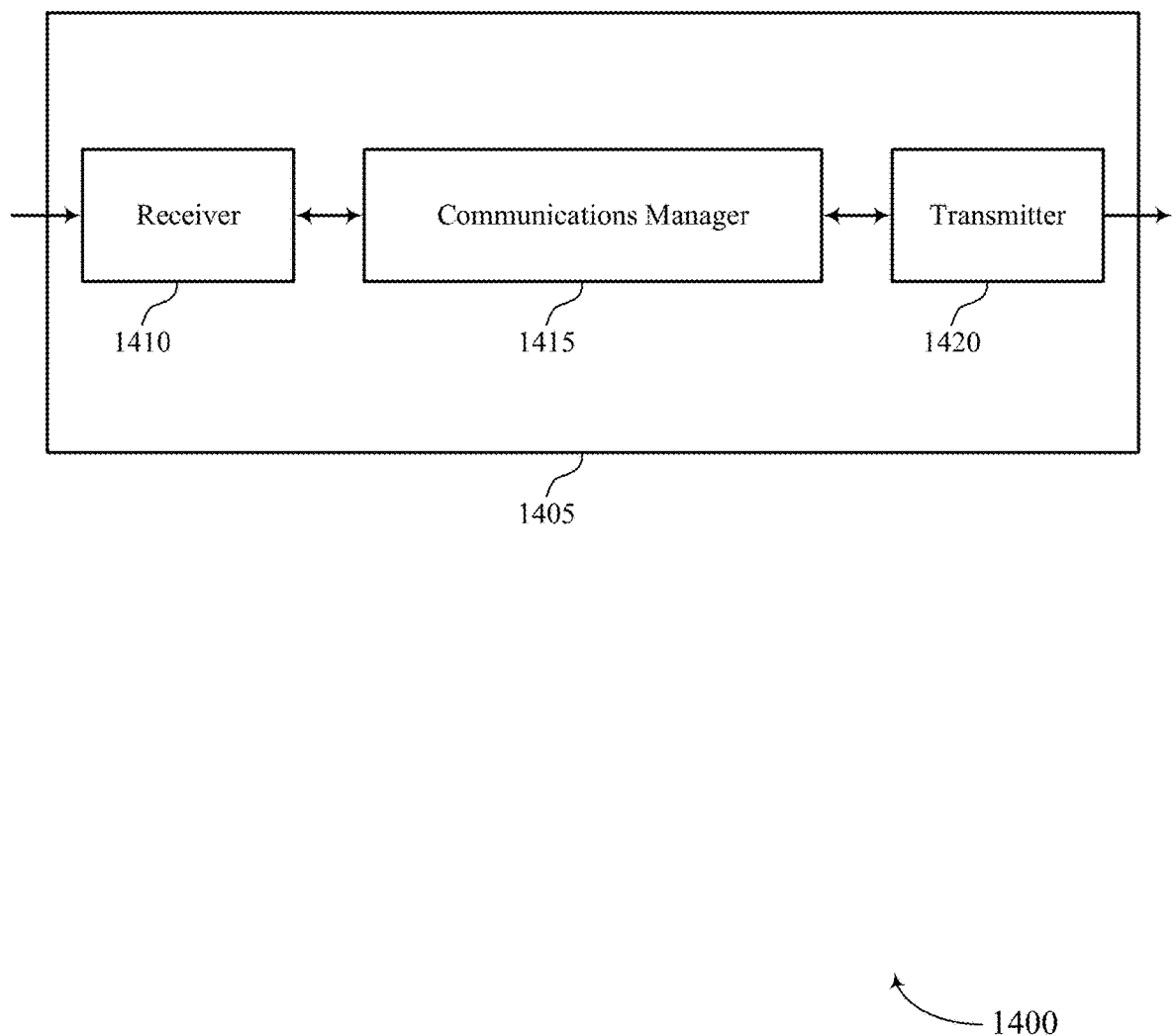
FIGS. 14 and 15 show block diagrams of devices that support TDRA for downlink data repetitions in accordance with aspects of the present disclosure.

FIG. 14 shows a block diagram 1400 of a device 1405 that supports TDRA for downlink data repetitions in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to TDRA for downlink data repetitions, etc.). Information may be passed on to other components of the device 1405. The receiver 1410 may be an example of aspects of the transceiver 1720 described with reference to FIG. 17. The receiver 1410 may utilize a single antenna or a set of antennas.

In some examples, the communications manager 1415 may transmit, to a UE, a DCI message indicating an explicit TDRA for a first repetition of a downlink data transmission, transmit, to the UE, the first repetition of the downlink data transmission according to the explicit TDRA and one or more additional repetitions of the downlink data transmission according to one or more implicit TDRAs, where the one or more implicit TDRAs are based on the explicit TDRA, and receive, from the UE, a feedback message based on the explicit TDRA and a HARQ-ACK codebook.

In some other examples, the communications manager 1415 may transmit, to a UE, a DCI message indicating a total TDRA for a set of repetitions of a downlink data transmission, transmit, to the UE, the set of repetitions of the downlink data transmission according to a set of TDRAs, where the total TDRA includes the set of TDRAs based on a number of repetitions for the downlink data transmission, and receive, from the UE, a feedback message based on the total TDRA and a HARQ-ACK codebook.

The actions performed by the communications manager 1415 as described herein may be implemented to realize one or more potential advantages. For example, indicating multiple TDRAs (e.g., implicit TDRAs, TDRAs from a total TDRA, etc.) using a single DCI transmission may reduce control channel overhead. Additionally, indicating the multiple TDRAs using a single TDRA field may limit the payload size of the DCI, effectively utilizing the DCI fields. Furthermore, receiving one ACK/NACK indication (e.g., in the feedback message) for the DCI message may reduce complexity by maintaining a one-to-one correlation between the ACK/NACK feedback and the DCI message.

Based on indicating the downlink data TDRAs using the single DCI message, a processor of the base station 105 (e.g., a processor controlling the receiver 1410, the communications manager 1415, the transmitter 1420, etc.) may reduce processing resources used for downlink transmission. For example, the base station 105 may encode a single TDRA field and transmit a single DCI to indicate multiple downlink data repetitions. As such, the base station 105 may reduce a number of times the processor ramps up processing power and turns on processing units to handle DCI encoding and/or transmission. Furthermore, reducing the number of DCI messages may reduce the signaling overhead on the downlink control channel. Additionally, considering the TDRA indicated in the DCI message for HARQ feedback (e.g., and not the implicit TDRAs or each individual TDRA) may reduce processing resources used for handling HARQ feedback (e.g., as a single ACK/NACK is received and checked for a set of multiple downlink data repetitions).

The communications manager 1415 may be an example of aspects of the communications manager 1710 described herein. The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
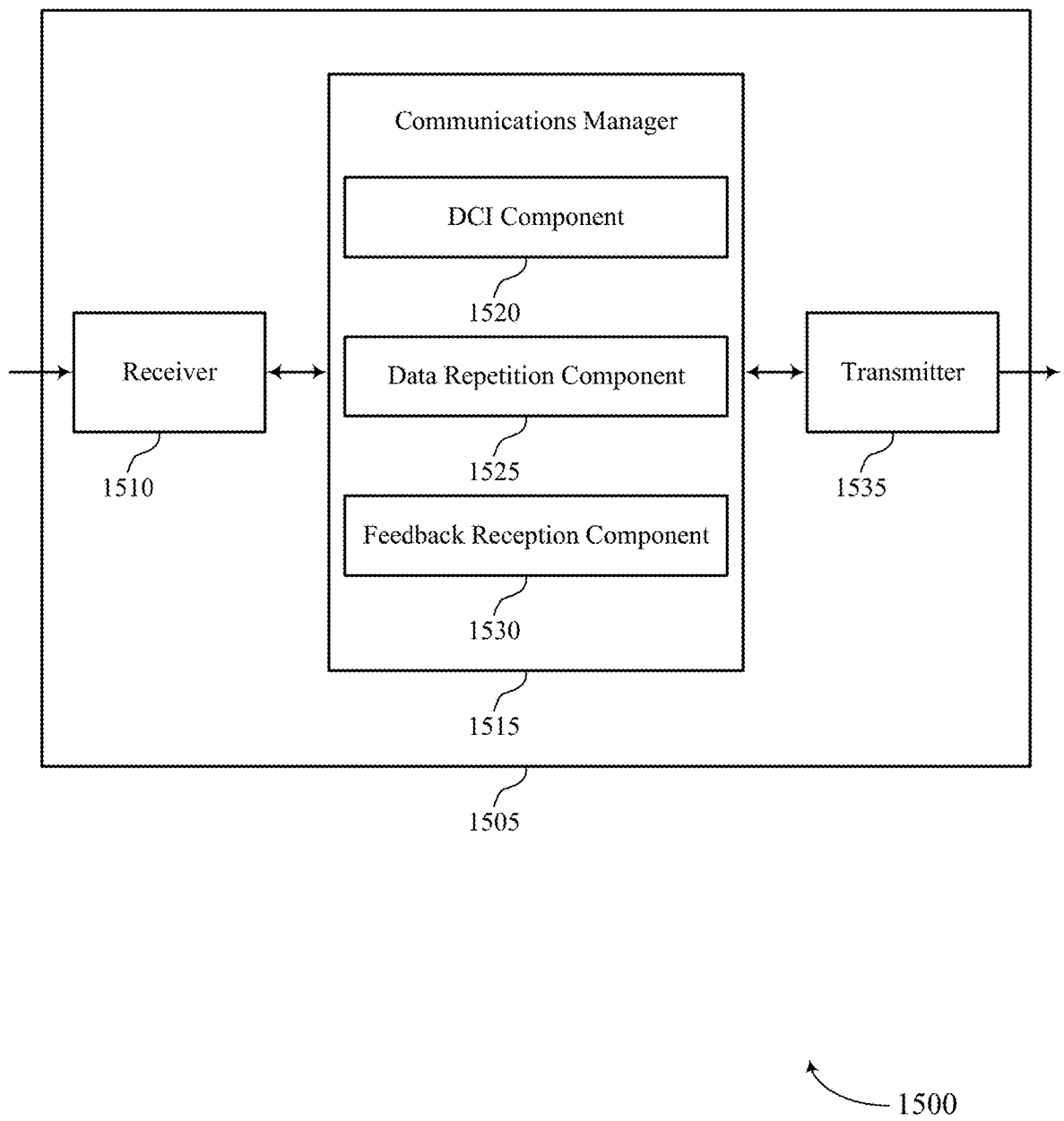

FIG. 15 shows a block diagram 1500 of a device 1505 that supports TDRA for downlink data repetitions in accordance with aspects of the present disclosure. The device 1505 may be an example of aspects of a device 1405 or a base station 105 as described herein. The device 1505 may include a receiver 1510, a communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to TDRA for downlink data repetitions, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a DCI component 1520, a data repetition component 1525, and a feedback reception component 1530. The communications manager 1515 may be an example of aspects of the communications manager 1710 described herein.

In some cases, the DCI component 1520 may transmit, to a UE, a DCI message indicating an explicit TDRA for a first repetition of a downlink data transmission. The data repetition component 1525 may transmit, to the UE, the first repetition of the downlink data transmission according to the explicit TDRA and one or more additional repetitions of the downlink data transmission according to one or more implicit TDRAs, where the one or more implicit TDRAs are based on the explicit TDRA. The feedback reception component 1530 may receive, from the UE, a feedback message based on the explicit TDRA and a HARQ-ACK codebook.

In some other cases, the DCI component 1520 may transmit, to a UE, a DCI message indicating a total TDRA for a set of repetitions of a downlink data transmission. The data repetition component 1525 may transmit, to the UE, the set of repetitions of the downlink data transmission according to a set of TDRAs, where the total TDRA includes the set of TDRAs based on a number of repetitions for the downlink data transmission. The feedback reception component 1530 may receive, from the UE, a feedback message based on the total TDRA and a HARQ-ACK codebook.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
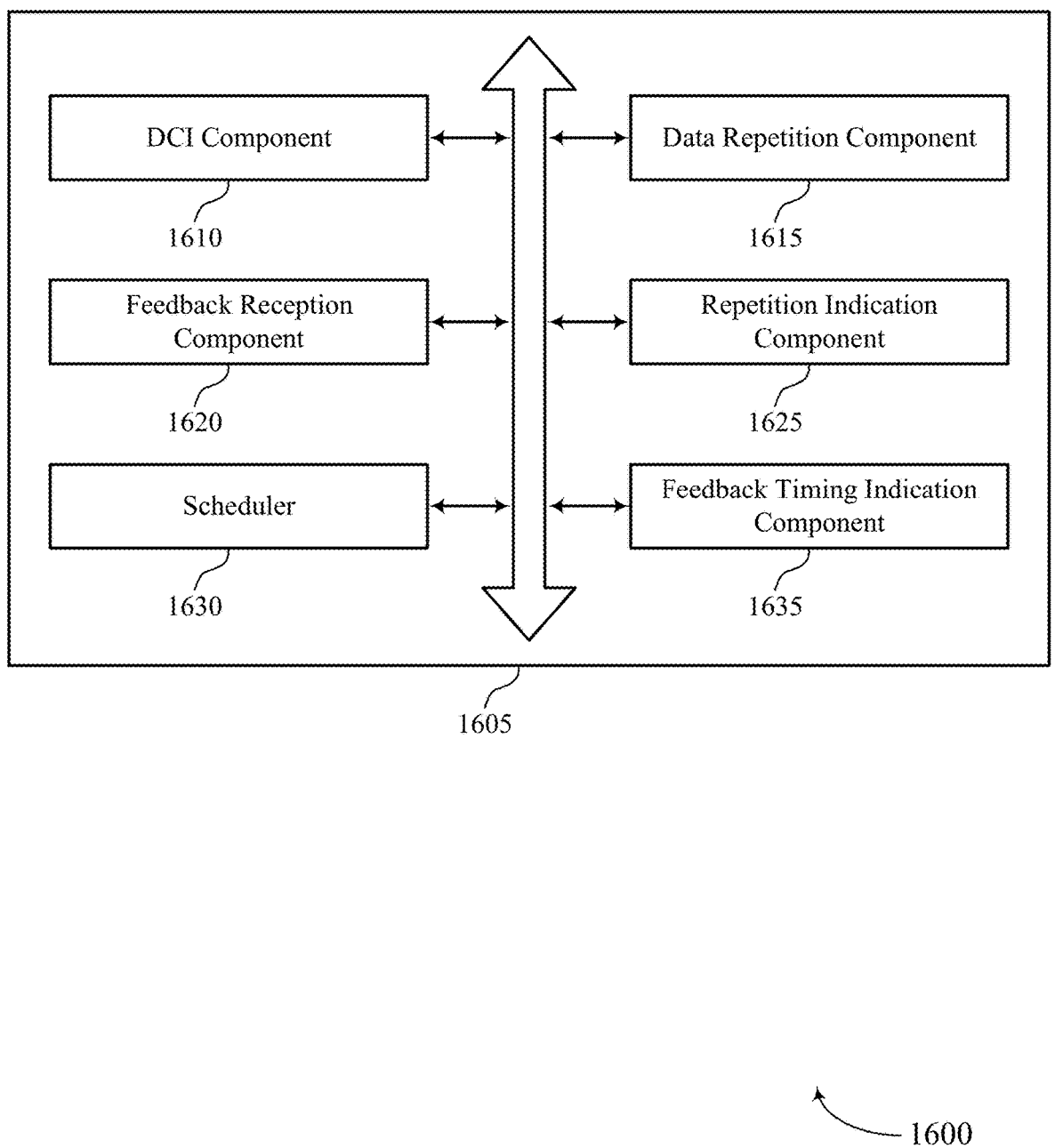
FIG. 16 shows a block diagram of a communications manager that supports TDRA for downlink data repetitions in accordance with aspects of the present disclosure.

FIG. 16 shows a block diagram 1600 of a communications manager 1605 that supports TDRA for downlink data repetitions in accordance with aspects of the present disclosure. The communications manager 1605 may be an example of aspects of a communications manager 1415, a communications manager 1515, or a communications manager 1710 described herein. The communications manager 1605 may include a DCI component 1610, a data repetition component 1615, a feedback reception component 1620, a repetition indication component 1625, a scheduler 1630, a feedback timing indication component 1635, or a combination thereof. Each of these modules may communicate, directly or indirectly, with one another (e.g., via one or more buses).

In a first implementation, the DCI component 1610 may transmit, to a UE, a DCI message indicating an explicit TDRA for a first repetition of a downlink data transmission. The data repetition component 1615 may transmit, to the UE, the first repetition of the downlink data transmission according to the explicit TDRA and one or more additional repetitions of the downlink data transmission according to one or more implicit TDRAs, where the one or more implicit TDRAs are based on the explicit TDRA. The feedback reception component 1620 may receive, from the UE, a feedback message based on the explicit TDRA and a HARQ-ACK codebook.

In some cases, the HARQ-ACK codebook includes an ACK/NACK indication for the downlink data transmission based on the explicit TDRA and whether the UE successfully receives the first repetition of the downlink data transmission.

The repetition indication component 1625 may transmit, to the UE, an indication of a number of repetitions for the downlink data transmission in the DCI message, an RRC configuration, or a combination thereof, where the one or more implicit TDRAs are further based on the number of repetitions. In some examples, the indication of the number of repetitions indicates a nominal number of repetitions, and the repetition indication component 1625 may determine an actual number of repetitions based on the nominal number of repetitions and a slot boundary, an uplink/downlink switching point, or a combination thereof, where the one or more implicit TDRAs are further based on the actual number of repetitions.

In some examples, the scheduler 1630 may schedule the explicit TDRA such that no symbol of the explicit TDRA is configured for uplink. In some cases, the scheduler 1630 may schedule the explicit TDRA and the one or more implicit TDRAs such that the explicit TDRA and the one or more implicit TDRAs are within a single slot. In some other cases, the scheduler 1630 may schedule the explicit TDRA and the one or more implicit TDRAs such that the explicit TDRA and the one or more implicit TDRAs span a set of slots. The feedback timing indication component 1635 may transmit, in the DCI message, a feedback timing indicator corresponding to a last slot in time of the set of slots, where the feedback message is received based on the feedback timing indicator.

In a second implementation, the DCI component 1610 may transmit, to a UE, a DCI message indicating a total TDRA for a set of repetitions of a downlink data transmission. The data repetition component 1615 may transmit, to the UE, the set of repetitions of the downlink data transmission according to a set of TDRAs, where the total TDRA includes the set of TDRAs based on a number of repetitions for the downlink data transmission. The feedback reception component 1620 may receive, from the UE, a feedback message based on the total TDRA and a HARQ-ACK codebook.

In some cases, the HARQ-ACK codebook includes an ACK/NACK indication for the downlink data transmission based on the total TDRA and whether the UE successfully receives the set of repetitions of the downlink data transmission.

The repetition indication component 1625 may transmit, to the UE, an indication of the number of repetitions for the downlink data transmission in the DCI message, an RRC configuration, or a combination thereof.

In some examples, the scheduler 1630 may schedule the total TDRA such that no symbol of the total TDRA is configured for uplink. In some cases, the scheduler 1630 may schedule the total TDRA such that the total TDRA is within a single slot. In some other cases, the scheduler 1630 may schedule the total TDRA such that the total TDRA spans a set of slots. In some examples, the feedback timing indication component 1635 may transmit, in the DCI message, a feedback timing indicator corresponding to a last slot in time of the set of slots, where the feedback message is received based on the feedback timing indicator.

Figure 17:
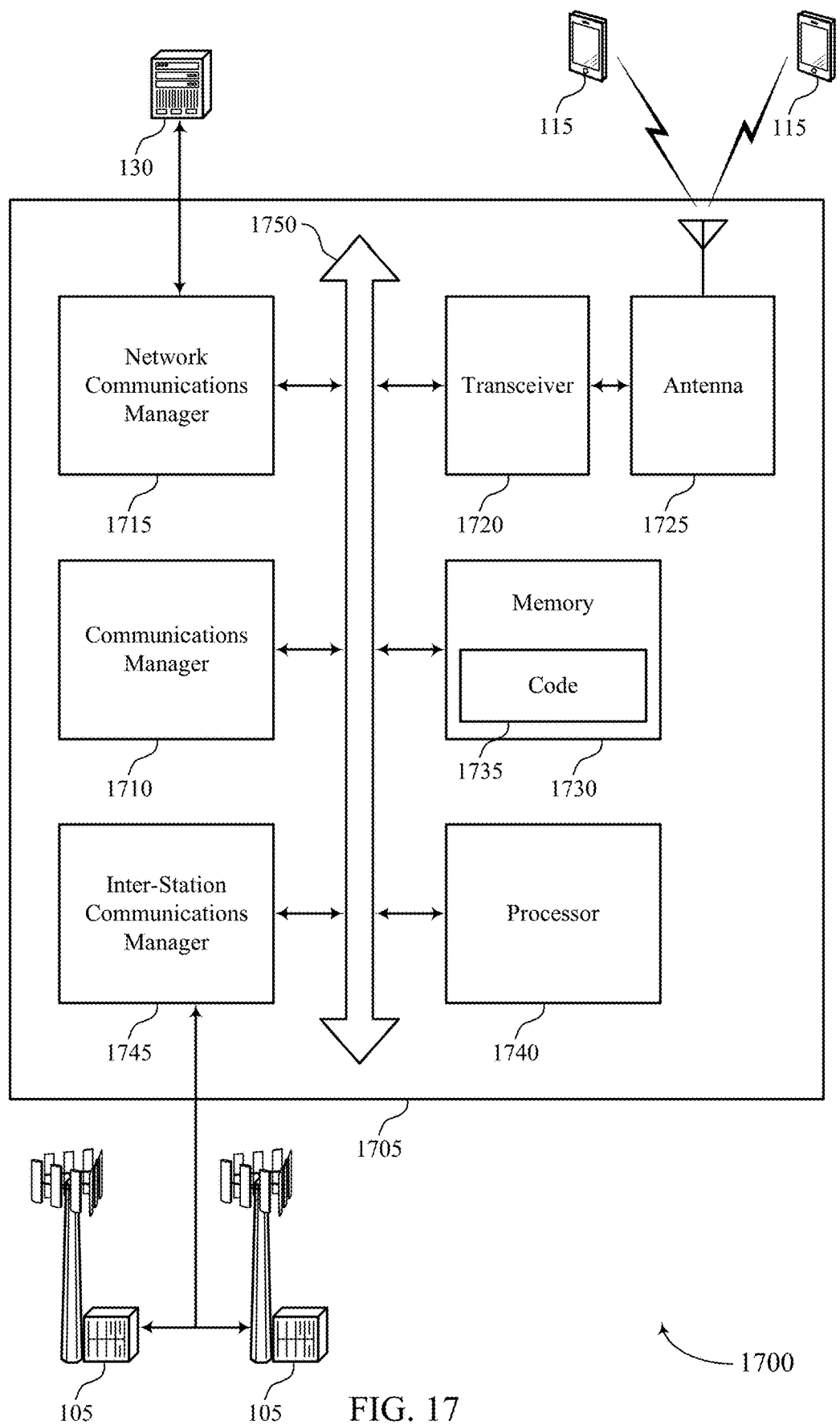
FIG. 17 shows a diagram of a system including a device that supports TDRA for downlink data repetitions in accordance with aspects of the present disclosure.

FIG. 17 shows a diagram of a system 1700 including a device 1705 that supports TDRA for downlink data repetitions in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may transmit, to a UE, a DCI message indicating an explicit TDRA for a first repetition of a downlink data transmission, transmit, to the UE, the first repetition of the downlink data transmission according to the explicit TDRA and one or more additional repetitions of the downlink data transmission according to one or more implicit TDRAs, where the one or more implicit TDRAs are based on the explicit TDRA, and receive, from the UE, a feedback message based on the explicit TDRA and a HARQ-ACK codebook.

Additionally or alternatively, the communications manager 1710 may transmit, to a UE, a DCI message indicating a total TDRA for a set of repetitions of a downlink data transmission, transmit, to the UE, the set of repetitions of the downlink data transmission according to a set of TDRAs, where the total TDRA includes the set of TDRAs based on a number of repetitions for the downlink data transmission, and receive, from the UE, a feedback message based on the total TDRA and a HARQ-ACK codebook.

The network communications manager 1715 may manage communications with the core network 130 (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting TDRA for downlink data repetitions).

The inter-station communications manager 1745 may manage communications with other base station 105 and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
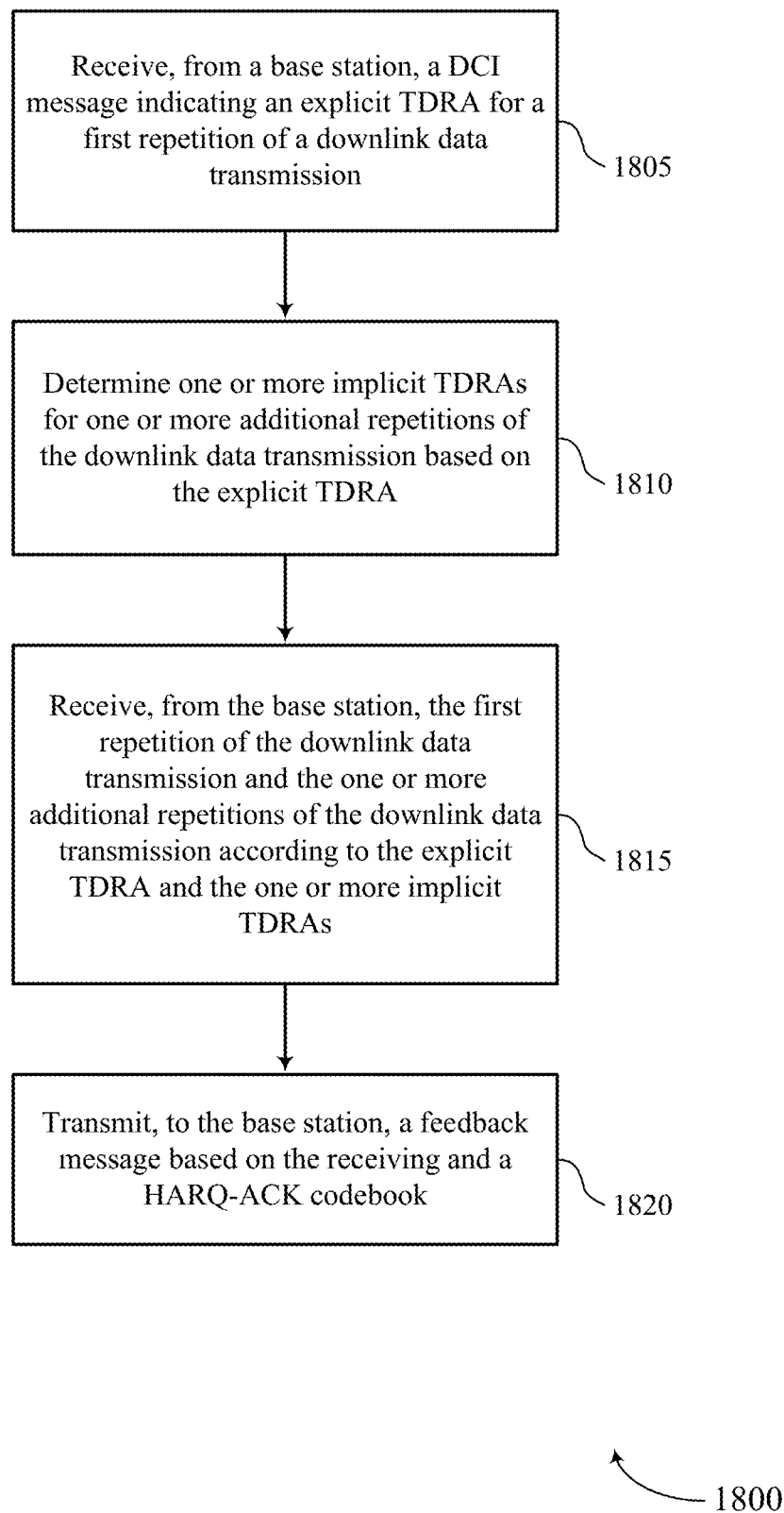
FIGS. 18 through 21 show flowcharts illustrating methods that support TDRA for downlink data repetitions in accordance with aspects of the present disclosure.

FIG. 18 shows a flowchart illustrating a method 1800 that supports TDRA for downlink data repetitions in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a DCI message indicating an explicit TDRA for a first repetition of a downlink data transmission. The operations of 1805 may be performed according to the methods described herein. In some examples, aspects of the operations of 1805 may be performed by an explicit TDRA component as described with reference to FIGS. 10 through 13.

At 1810, the UE may determine one or more implicit TDRAs for one or more additional repetitions of the downlink data transmission based on the explicit TDRA. The operations of 1810 may be performed according to the methods described herein. In some examples, aspects of the operations of 1810 may be performed by an implicit TDRA component as described with reference to FIGS. 10 through 13.

At 1815, the UE may receive, from the base station, the first repetition of the downlink data transmission and the one or more additional repetitions of the downlink data transmission according to the explicit TDRA and the one or more implicit TDRAs. The operations of 1815 may be performed according to the methods described herein. In some examples, aspects of the operations of 1815 may be performed by a data reception component as described with reference to FIGS. 10 through 13.

At 1820, the UE may transmit, to the base station, a feedback message based on the receiving and a HARQ-ACK codebook. The operations of 1820 may be performed according to the methods described herein. In some examples, aspects of the operations of 1820 may be performed by a feedback component as described with reference to FIGS. 10 through 13.

Figure 19:
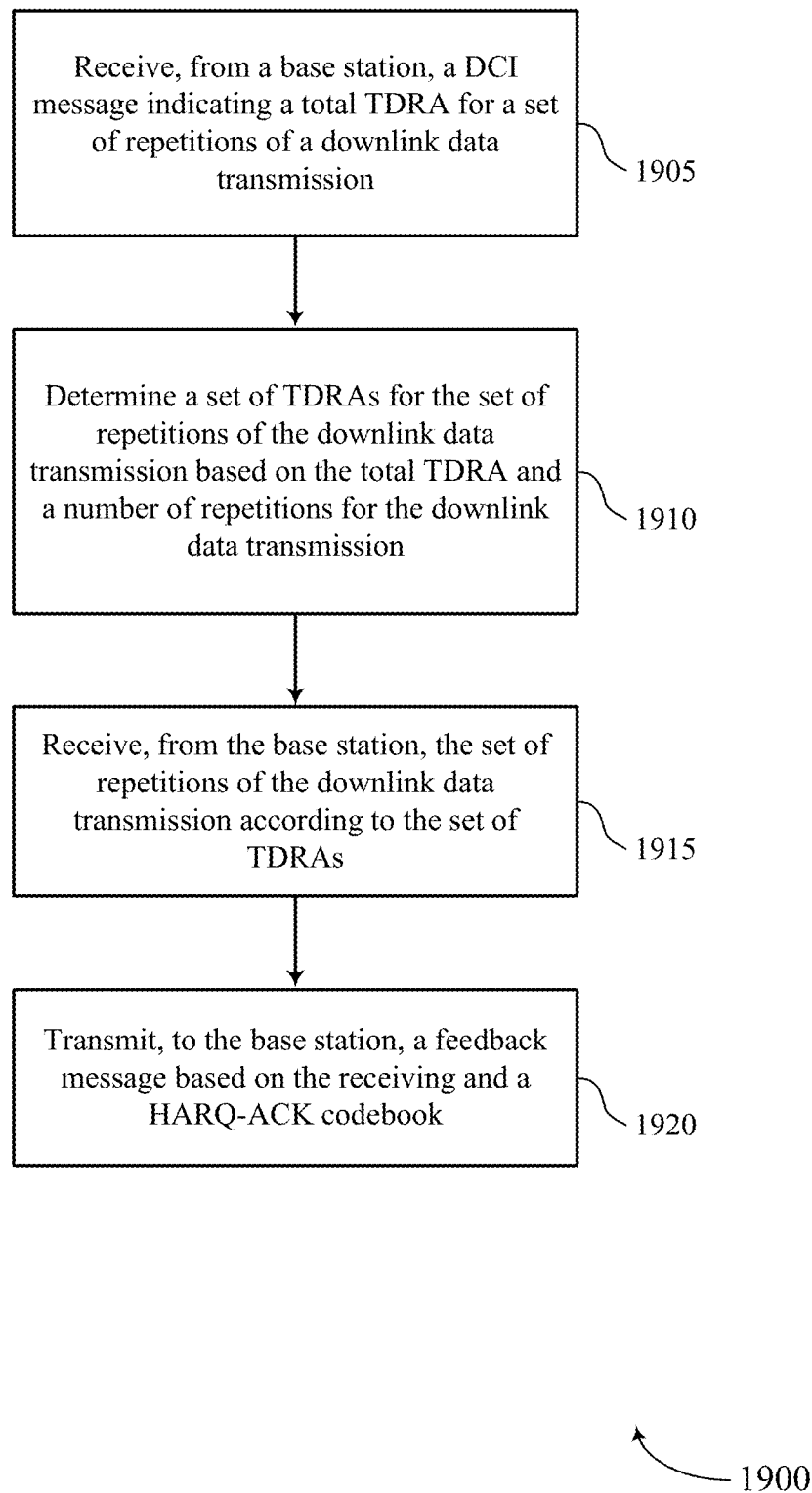

FIG. 19 shows a flowchart illustrating a method 1900 that supports TDRA for downlink data repetitions in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, a DCI message indicating a total TDRA for a set of repetitions of a downlink data transmission. The operations of 1905 may be performed according to the methods described herein. In some examples, aspects of the operations of 1905 may be performed by a total TDRA component as described with reference to FIGS. 10 through 13.

At 1910, the UE may determine a set of TDRAs for the set of repetitions of the downlink data transmission based on the total TDRA and a number of repetitions for the downlink data transmission. The operations of 1910 may be performed according to the methods described herein. In some examples, aspects of the operations of 1910 may be performed by a total TDRA divider as described with reference to FIGS. 10 through 13.

At 1915, the UE may receive, from the base station, the set of repetitions of the downlink data transmission according to the set of TDRAs. The operations of 1915 may be performed according to the methods described herein. In some examples, aspects of the operations of 1915 may be performed by a data reception component as described with reference to FIGS. 10 through 13.

At 1920, the UE may transmit, to the base station, a feedback message based on the receiving and a HARQ-ACK codebook. The operations of 1920 may be performed according to the methods described herein. In some examples, aspects of the operations of 1920 may be performed by a feedback component as described with reference to FIGS. 10 through 13.

Figure 20:
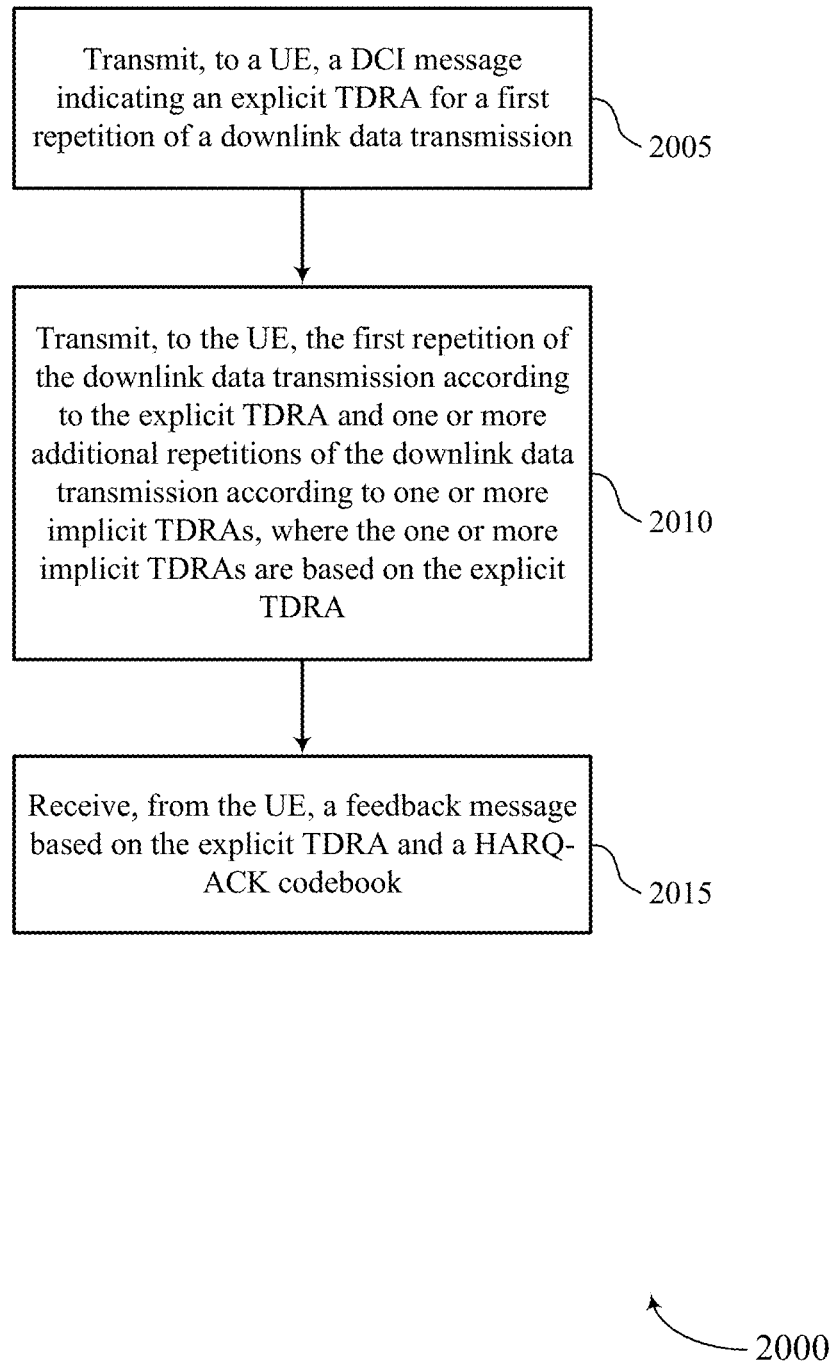

FIG. 20 shows a flowchart illustrating a method 2000 that supports TDRA for downlink data repetitions in accordance with aspects of the present disclosure. The operations of method 2000 may be implemented by a base station 105 or its components as described herein. For example, the operations of method 2000 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, a DCI message indicating an explicit TDRA for a first repetition of a downlink data transmission. The operations of 2005 may be performed according to the methods described herein. In some examples, aspects of the operations of 2005 may be performed by a DCI component as described with reference to FIGS. 14 through 17.

At 2010, the base station may transmit, to the UE, the first repetition of the downlink data transmission according to the explicit TDRA and one or more additional repetitions of the downlink data transmission according to one or more implicit TDRAs, where the one or more implicit TDRAs are based on the explicit TDRA. The operations of 2010 may be performed according to the methods described herein. In some examples, aspects of the operations of 2010 may be performed by a data repetition component as described with reference to FIGS. 14 through 17.

At 2015, the base station may receive, from the UE, a feedback message based on the explicit TDRA and a HARQ-ACK codebook. The operations of 2015 may be performed according to the methods described herein. In some examples, aspects of the operations of 2015 may be performed by a feedback reception component as described with reference to FIGS. 14 through 17.

Figure 21:
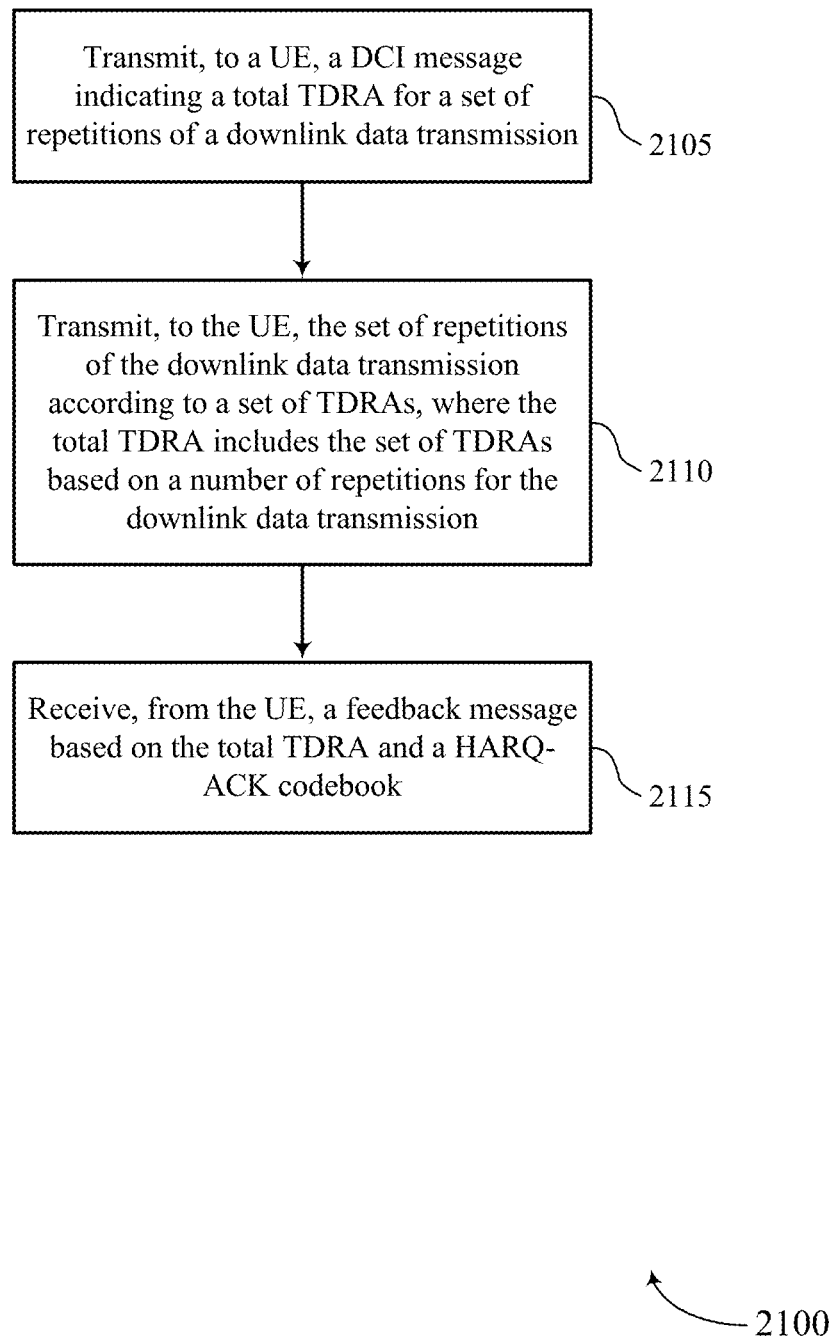

FIG. 21 shows a flowchart illustrating a method 2100 that supports TDRA for downlink data repetitions in accordance with aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE, a DCI message indicating a total TDRA for a set of repetitions of a downlink data transmission. The operations of 2105 may be performed according to the methods described herein. In some examples, aspects of the operations of 2105 may be performed by a DCI component as described with reference to FIGS. 14 through 17.

At 2110, the base station may transmit, to the UE, the set of repetitions of the downlink data transmission according to a set of TDRAs, where the total TDRA includes the set of TDRAs based on a number of repetitions for the downlink data transmission. The operations of 2110 may be performed according to the methods described herein. In some examples, aspects of the operations of 2110 may be performed by a data repetition component as described with reference to FIGS. 14 through 17.

At 2115, the base station may receive, from the UE, a feedback message based on the total TDRA and a HARQ-ACK codebook. The operations of 2115 may be performed according to the methods described herein. In some examples, aspects of the operations of 2115 may be performed by a feedback reception component as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE), comprising:
   one or more memories storing processor-executable code; and
   one or more processors coupled with the one or more memories and individually or collectively operable to execute the code to cause the UE to:
   receive, from a network device, a downlink control information message indicating a total time domain resource allocation for a plurality of repetitions of a downlink data transmission;
   determine a plurality of time domain resource allocations for the plurality of repetitions of the downlink data transmission based at least in part on the total time domain resource allocation and a number of repetitions for the downlink data transmission;
   receive, from the network device, the plurality of repetitions of the downlink data transmission according to the plurality of time domain resource allocations; and
   transmit, to the network device, a feedback message based at least in part on the receiving the plurality of repetitions of the downlink data transmission and on a hybrid automatic repeat request acknowledgment codebook.

2. The UE of claim 1, wherein the plurality of time domain resource allocations is determined further based at least in part on a set of possible sizes for each time domain resource allocation of the plurality of time domain resource allocations, an equal distribution of the plurality of time domain resource allocations in the total time domain resource allocation, or a combination thereof.

3. The UE of claim 1, wherein the one or more processors are individually or collectively further operable to execute the code to cause the UE to:
   identify the number of repetitions for the downlink data transmission based at least in part on the downlink control information message, a radio resource control configuration, a fixed repetition value, or a combination thereof.

4. The UE of claim 1, wherein the one or more processors are individually or collectively further operable to execute the code to cause the UE to:
   determine a plurality of time domain resource allocation candidates based at least in part on an uplink symbol, wherein the hybrid automatic repeat request acknowledgment codebook is based at least in part on the determined plurality of time domain resource allocation candidates.

5. The UE of claim 4, wherein, to determine the plurality of time domain resource allocation candidates, the one or more processors are individually or collectively operable to execute the code to cause the UE to:
   refrain from including a time domain resource allocation candidate in the plurality of time domain resource allocation candidates if a symbol of the time domain resource allocation candidate is configured for uplink, all symbols of the time domain resource allocation candidate are configured for uplink, at most one consecutive symbol of the time domain resource allocation candidate is configured for downlink, or a combination thereof.

6. The UE of claim 1, wherein:
   no symbol of the total time domain resource allocation is configured for uplink.

7. The UE of claim 1, wherein the total time domain resource allocation is within a single slot.

8. The UE of claim 1, wherein:
the total time domain resource allocation spans a plurality of slots; and
a feedback timing indicator corresponds to a last slot in time of the plurality of slots, wherein the feedback message is transmitted based at least in part on the feedback timing indicator.

9. The UE of claim 8, wherein the plurality of time domain resource allocations is determined further based at least in part on a slot boundary of the plurality of slots.

10. The UE of claim 1, wherein a first symbol in time of each time domain resource allocation of the plurality of time domain resource allocations corresponds to a demodulation reference signal symbol.

11. The UE of claim 1, wherein the downlink control information message indicates the total time domain resource allocation according to a start symbol, an allocation length, a start and length indicator, a mapping type, a slot offset, or a combination thereof.

12. A network device, comprising:
one or more memories storing processor-executable code; and
one or more processors coupled with the one or more memories and individually or collectively operable to execute the code to cause the network device to:
transmit, to a user equipment (UE), a downlink control information message indicating a total time domain resource allocation for a plurality of repetitions of a downlink data transmission;
transmit, to the UE, the plurality of repetitions of the downlink data transmission according to a plurality of time domain resource allocations, wherein the total time domain resource allocation comprises the plurality of time domain resource allocations based at least in part on a number of repetitions for the downlink data transmission; and
receive, from the UE, a feedback message based at least in part on the total time domain resource allocation and a hybrid automatic repeat request acknowledgment codebook.

13. The network device of claim 12, wherein the hybrid automatic repeat request acknowledgment codebook comprises a positive acknowledgment or negative acknowledgment indication for the plurality of repetitions of the downlink data transmission based at least in part on the total time domain resource allocation and whether the UE successfully receives the plurality of repetitions of the downlink data transmission.

14. The network device of claim 12, wherein the one or more processors are individually or collectively further operable to execute the code to cause the network device to:
transmit, to the UE, an indication of the number of repetitions for the downlink data transmission in the downlink control information message, a radio resource control configuration, or a combination thereof.

15. The network device of claim 12, wherein the one or more processors are individually or collectively further operable to execute the code to cause the network device to:
schedule the total time domain resource allocation such that no symbol of the total time domain resource allocation is configured for uplink.

16. The network device of claim 12, wherein the one or more processors are individually or collectively further operable to execute the code to cause the network device to:
schedule the total time domain resource allocation such that the total time domain resource allocation is within a single slot.

17. The network device of claim 12, wherein the one or more processors are individually or collectively further operable to execute the code to cause the network device to:
schedule the total time domain resource allocation such that the total time domain resource allocation spans a plurality of slots; and
transmit, in the downlink control information message, a feedback timing indicator corresponding to a last slot in time of the plurality of slots, wherein the feedback message is received based at least in part on the feedback timing indicator.

18. A method for wireless communications at a user equipment (UE), comprising:
receiving, from a network device, a downlink control information message indicating a total time domain resource allocation for a plurality of repetitions of a downlink data transmission;
determining a plurality of time domain resource allocations for the plurality of repetitions of the downlink data transmission based at least in part on the total time domain resource allocation and a number of repetitions for the downlink data transmission;
receiving, from the network device, the plurality of repetitions of the downlink data transmission according to the plurality of time domain resource allocations; and
transmitting, to the network device, a feedback message based at least in part on the receiving the plurality of repetitions of the downlink data transmission and on a hybrid automatic repeat request acknowledgment codebook.

19. The method of claim 18, wherein the plurality of time domain resource allocations is determined further based at least in part on a set of possible sizes for each time domain resource allocation of the plurality of time domain resource allocations, an equal distribution of the plurality of time domain resource allocations in the total time domain resource allocation, or a combination thereof.

20. The method of claim 18, further comprising:
identifying the number of repetitions for the downlink data transmission based at least in part on the downlink control information message, a radio resource control configuration, a fixed repetition value, or a combination thereof.

21. The method of claim 18, further comprising:
determining a plurality of time domain resource allocation candidates based at least in part on an uplink symbol, wherein the hybrid automatic repeat request acknowledgment codebook is based at least in part on the determined plurality of time domain resource allocation candidates.

22. The method of claim 21, wherein determining the plurality of time domain resource allocation candidates comprises:
refraining from including a time domain resource allocation candidate in the plurality of time domain resource allocation candidates if a symbol of the time domain resource allocation candidate is configured for uplink, all symbols of the time domain resource allocation candidate are configured for uplink, at most one consecutive symbol of the time domain resource allocation candidate is configured for downlink, or a combination thereof.

23. The method of claim 18, wherein no symbol of the total time domain resource allocation is configured for uplink.

24. The method of claim 18, wherein the total time domain resource allocation is within a single slot.

25. The method of claim 18, wherein:
the total time domain resource allocation spans a plurality of slots; and
a feedback timing indicator corresponds to a last slot in time of the plurality of slots, wherein the feedback message is transmitted based at least in part on the feedback timing indicator.

26. The method of claim 25, wherein the plurality of time domain resource allocations is determined further based at least in part on a slot boundary of the plurality of slots.

27. The method of claim 18, wherein a first symbol in time of each time domain resource allocation of the plurality of time domain resource allocations corresponds to a demodulation reference signal symbol.

28. The method of claim 18, wherein the downlink control information message indicates the total time domain resource allocation according to a start symbol, an allocation length, a start and length indicator, a mapping type, a slot offset, or a combination thereof.

29. A method for wireless communications at a network device, comprising:
transmitting, to a user equipment (UE), a downlink control information message indicating a total time domain resource allocation for a plurality of repetitions of a downlink data transmission;
transmitting, to the UE, the plurality of repetitions of the downlink data transmission according to a plurality of time domain resource allocations, wherein the total time domain resource allocation comprises the plurality of time domain resource allocations based at least in part on a number of repetitions for the downlink data transmission; and
receiving, from the UE, a feedback message based at least in part on the total time domain resource allocation and a hybrid automatic repeat request acknowledgment codebook.

30. The method of claim 29, wherein the hybrid automatic repeat request acknowledgment codebook comprises a positive acknowledgment or negative acknowledgment indication for the plurality of repetitions of the downlink data transmission based at least in part on the total time domain resource allocation and whether the UE successfully receives the plurality of repetitions of the downlink data transmission.

31. The method of claim 29, further comprising:
transmitting, to the UE, an indication of the number of repetitions for the downlink data transmission in the downlink control information message, a radio resource control configuration, or a combination thereof.

32. The method of claim 29, further comprising:
scheduling the total time domain resource allocation such that no symbol of the total time domain resource allocation is configured for uplink.

33. The method of claim 29, further comprising:
scheduling the total time domain resource allocation such that the total time domain resource allocation is within a single slot.

34. The method of claim 29, further comprising:
scheduling the total time domain resource allocation such that the total time domain resource allocation spans a plurality of slots; and transmitting, in the downlink control information message, a feedback timing indicator corresponding to a last slot in time of the plurality of slots, wherein the feedback message is received based at least in part on the feedback timing indicator.

35. A user equipment (UE), comprising:
one or more memories storing processor-executable code; and
one or more processors coupled with the one or more memories and individually or collectively operable to execute the code to cause the UE to:
receive, from a network device, a downlink control information message indicating an explicit time domain resource allocation for a first repetition of a downlink data transmission;
receive, from the network device, the first repetition of the downlink data transmission and one or more additional repetitions of the downlink data transmission according to the explicit time domain resource allocation and one or more implicit time domain resource allocations, the one or more implicit time domain resource allocations being for the one or more additional repetitions of the downlink data transmission and based at least in part on the explicit time domain resource allocation;
generate a hybrid automatic repeat request acknowledgment codebook based at least in part on the explicit time domain resource allocation and the first repetition of the downlink data transmission and the one or more additional repetitions of the downlink data transmission; and
transmit, to the network device, a message based at least in part on the first repetition of the downlink data transmission and the one or more additional repetitions of the downlink data transmission and the hybrid automatic repeat request acknowledgment codebook.

36. A network device, comprising:
one or more memories storing processor-executable code; and
one or more processors coupled with the one or more memories and individually or collectively operable to execute the code to cause the network device to:
output a downlink control information message indicating an explicit time domain resource allocation for a first repetition of a downlink data transmission for a user equipment (UE);
output the first repetition of the downlink data transmission according to the explicit time domain resource allocation and one or more additional repetitions of the downlink data transmission according to one or more implicit time domain resource allocations, wherein the one or more implicit time domain resource allocations are based at least in part on the explicit time domain resource allocation; and
obtain a message based at least in part on the explicit time domain resource allocation and a hybrid automatic repeat request acknowledgment codebook, wherein the hybrid automatic repeat request acknowledgment codebook is based at least in part on the explicit time domain resource allocation and the first repetition of the downlink data transmission and the one or more additional repetitions of the downlink data transmission.

* * * * *